United States Patent
Robertson et al.

(10) Patent No.: US 12,540,526 B2
(45) Date of Patent: Feb. 3, 2026

(54) DEGRADABLE PLUG DEVICE FOR A PIPE

(71) Applicant: Robertson Intellectual Properties, LLC, Arlington, TX (US)

(72) Inventors: Michael C. Robertson, Arlington, TX (US); Douglas J. Streibich, Arlington, TX (US)

(73) Assignee: Robertson Intellectual Properties, LLC, Mansfield, TX (US)

( * ) Notice: Subject to any disclaimer, the term of this patent is extended or adjusted under 35 U.S.C. 154(b) by 18 days.

(21) Appl. No.: 18/199,247

(22) Filed: May 18, 2023

(65) Prior Publication Data
US 2023/0304373 A1 Sep. 28, 2023

Related U.S. Application Data

(60) Continuation-in-part of application No. 17/384,386, filed on Jul. 23, 2021, now Pat. No. 11,655,686.
(Continued)

(30) Foreign Application Priority Data

Apr. 30, 2016 (GB) ...................... 1607619

(51) Int. Cl.
*E21B 33/12* (2006.01)
*F16L 55/11* (2006.01)
*F16L 55/42* (2006.01)

(52) U.S. Cl.
CPC .......... *E21B 33/1208* (2013.01); *E21B 33/12* (2013.01); *F16L 55/11* (2013.01); *F16L 55/42* (2013.01)

(58) Field of Classification Search
CPC .... E21B 33/1208; E21B 33/12; E21B 33/134; E21B 29/02; F16L 55/42; F16L 55/11; F16L 55/128
See application file for complete search history.

(56) References Cited

U.S. PATENT DOCUMENTS 5,607,017 A * 3/1997 Owens ................... E21B 33/12
166/317
9,057,242 B2 6/2015 Mazyar et al.
(Continued)

FOREIGN PATENT DOCUMENTS

CN 113622866 A * 11/2021

OTHER PUBLICATIONS

ISR 10072017, International Search Report cited in the corresponding PCT Application No. PCT/GB2017/000061; Oct. 7, 2017; 9 pages.

*Primary Examiner* — George S Gray
(74) *Attorney, Agent, or Firm* — McCutcheon Joseph, PLLC

(57) ABSTRACT

A degradable plug device for a pipe prevents fluid flow through the pipe until the plug device has been removed from the pipe. The plug device includes a body which is at least partially of a degradable material. The exposed surfaces of the degradable plug include a protective layer thereon. The body includes a chamber therein. The body is disposable in the pipe to prevent fluid flow through the pipe. The plug is adapted to undergo a degradation initiation operation such that well fluid is able to enter the chamber to initiate corrosion or dissolution of the body from inside the chamber. The plug is useful for temporarily blocking a pipe within a well to control the flow of fluids or to actuate tools within the well.

12 Claims, 15 Drawing Sheets

Related U.S. Application Data which is a division of application No. 16/096,624, filed as application No. PCT/GB2017/000061 on Apr. 26, 2017, now Pat. No. 11,072,991.

(56) References Cited

U.S. PATENT DOCUMENTS

| | | |
|---|---|---|
| 9,062,543 B1 | 6/2015 | Snider et al. |
| 2007/0074873 A1 | 4/2007 | McKeachnie et al. |
| 2008/0135249 A1 | 6/2008 | Fripp et al. |
| 2012/0211239 A1 | 8/2012 | Kritzler et al. |
| 2013/0240200 A1 | 9/2013 | Frazier |
| 2014/0190685 A1 | 7/2014 | Frazier et al. |
| 2014/0246209 A1 | 9/2014 | Themig et al. |
| 2014/0284063 A1 | 9/2014 | Fripp et al. |
| 2016/0356137 A1 | 12/2016 | Hardesty et al. |
| 2017/0314359 A1 | 11/2017 | Fripp et al. |
| 2017/0356266 A1* | 12/2017 | Arackakudiyil ........ E21B 49/08 |
| 2018/0045014 A1* | 2/2018 | Larisey .................. E21B 33/12 |
| 2020/0102807 A1* | 4/2020 | Kennedy .............. E21B 34/103 |
| 2021/0047895 A1* | 2/2021 | Sherman ................ E21B 29/02 |
| 2021/0140262 A1* | 5/2021 | Yuan ...................... E21B 33/12 |
| 2022/0042393 A1* | 2/2022 | Jacob .................. E21B 33/1285 |
| 2024/0191596 A1* | 6/2024 | Morrison ............. E21B 34/063 |

* cited by examiner

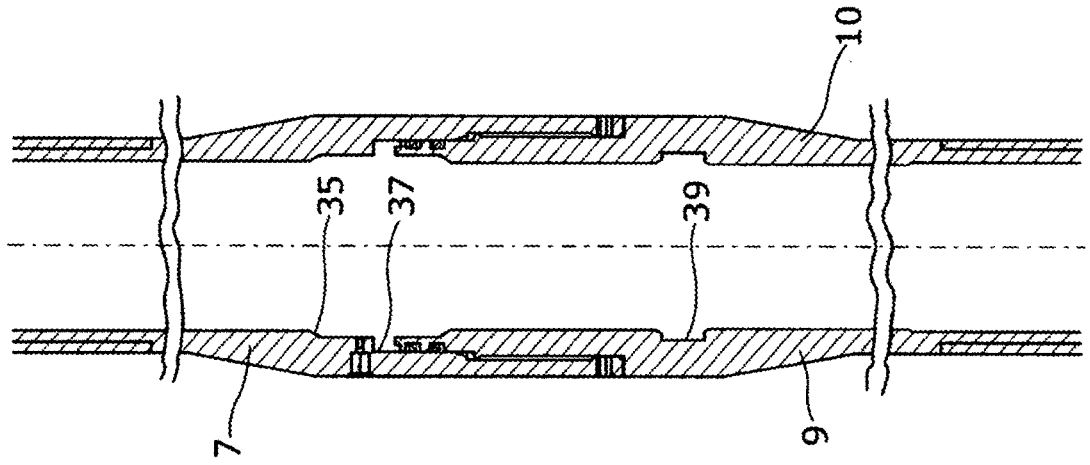
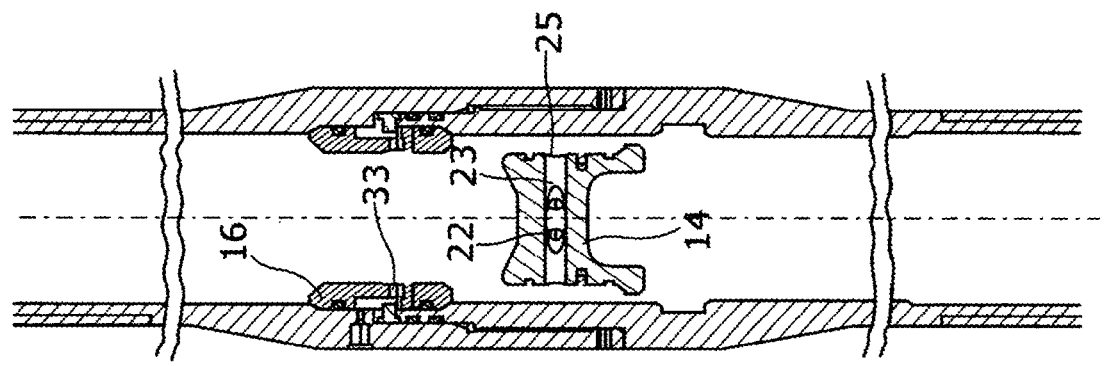
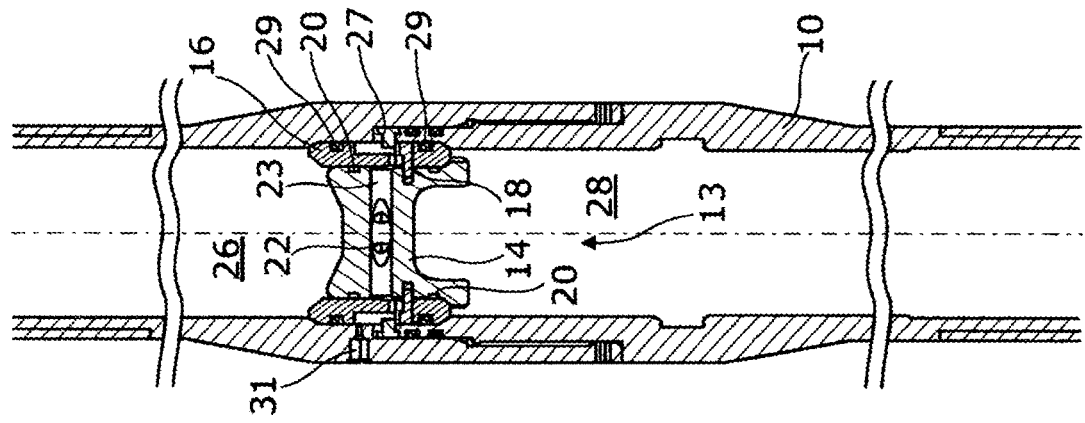

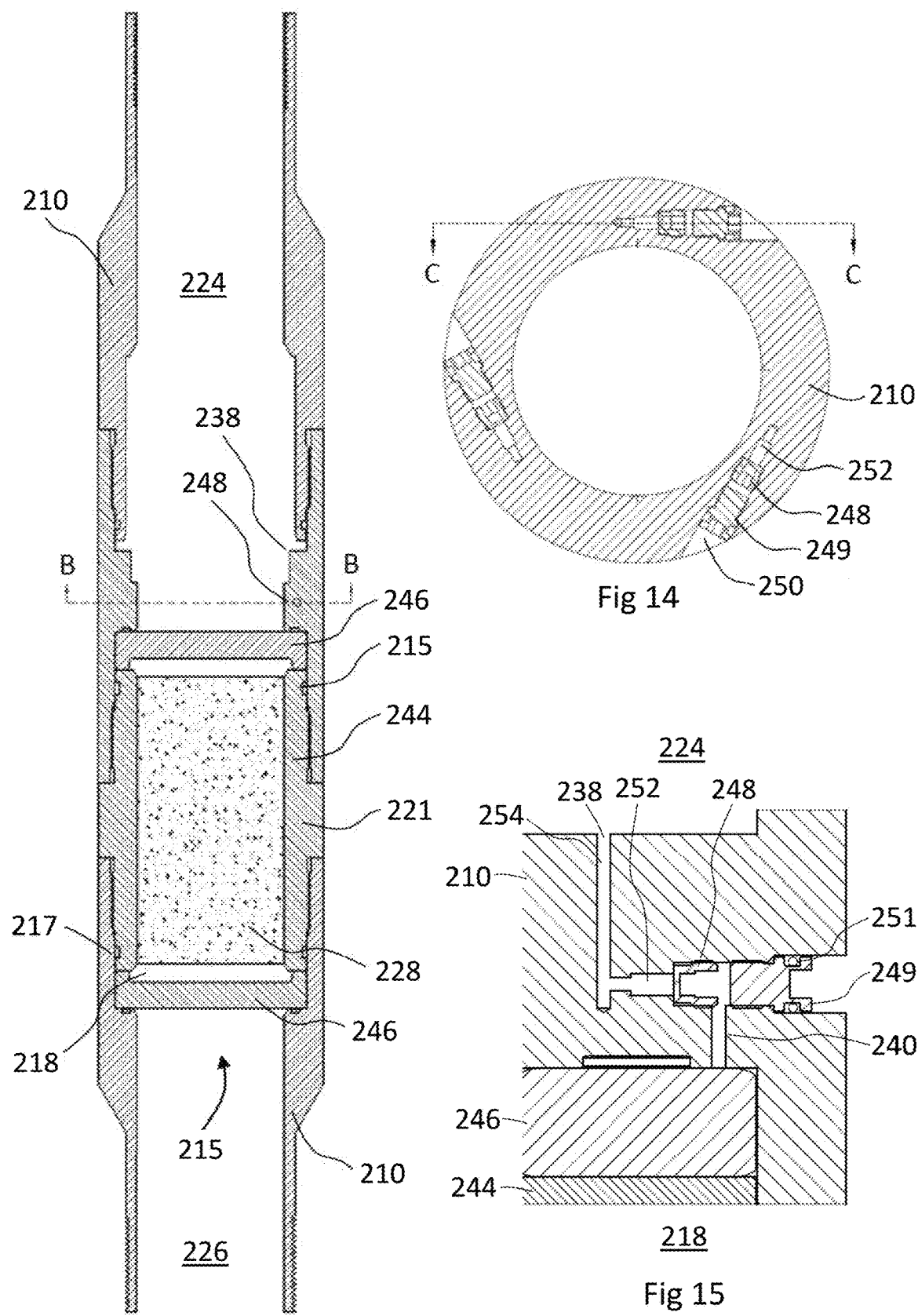

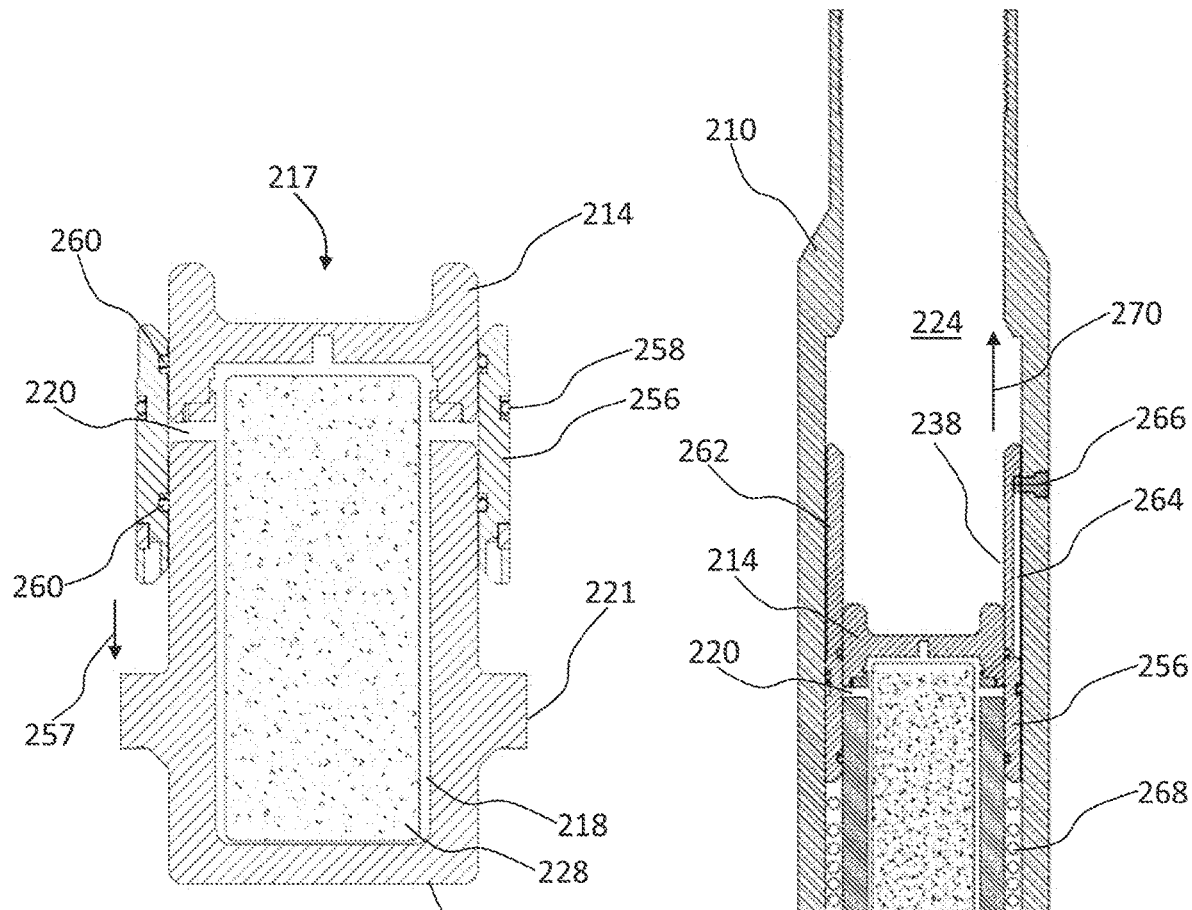
Fig 16
Fig 17
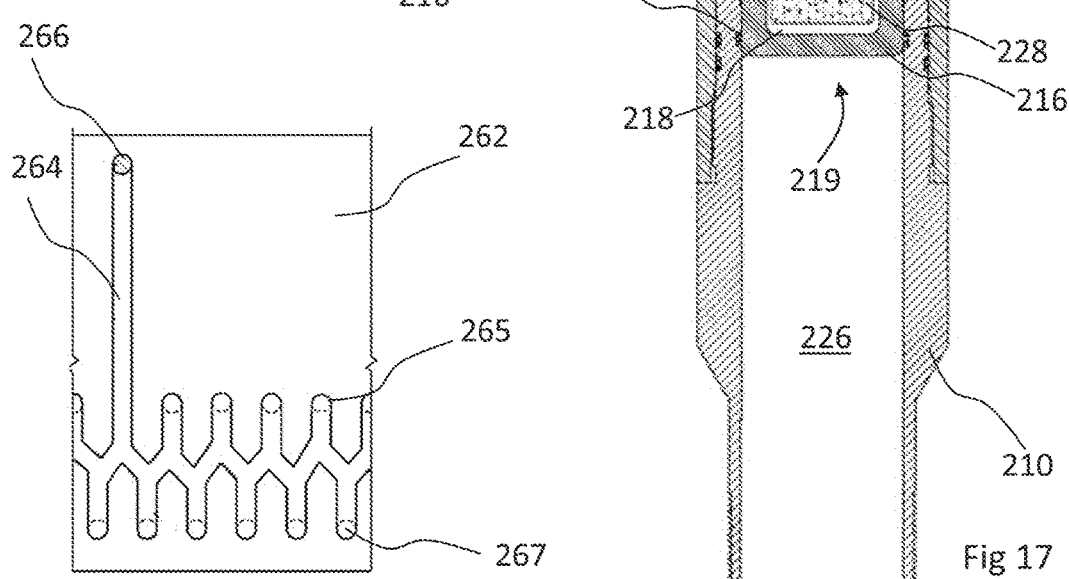
Fig 17a

DEGRADABLE PLUG DEVICE FOR A PIPE

CROSS REFERENCE TO RELATED APPLICATIONS

The present application is a continuation-in-part of U.S. patent application Ser. No. 17/384,386, titled "Degradable Plug Device for a Pipe", filed on Jul. 23, 2021, which is a divisional of U.S. patent application Ser. No. 16/096,624, titled "Degradable Plug Device for a Pipe", filed on Oct. 25, 2018, which is a National Phase of International Patent Application No. PCT/GB2017/000061, filed on Apr. 26, 2017, which claims the benefit of U.K. Patent Application No. 1607619.2, filed on Apr. 30, 2016. The disclosures of the prior applications are hereby incorporated by reference herein in their entireties.

TECHNICAL FIELD

The invention relates to a degradable plug device for a pipe, an apparatus with a pipe and the plug, and a method for operation thereof.

BACKGROUND

A part of an oil or gas well may be required to be temporarily blocked to control the flow of fluids, or to actuate tools within the well. Such temporary blocking may also be required to allow pressure testing of the pipework of the well, for example, casings, plugs, packers, liners etc. It is known to insert a magnesium ball into the well to temporary block a part of the well. The ball typically rests on a collar or restriction within the pipework, and blocks it so that the required operation can be completed. When the operation has been completed the magnesium ball may be dissolved by brine which is present in the well fluid. Alternatively, an acid such as Hydrochloric acid may be used to provide faster dissolving of the magnesium ball. Typically the magnesium ball dissolves over a period of a few hours to a few days. A problem with using an acid such as Hydrochloric acid is that it may be difficult to transport between different countries because it may be classed as a restricted substance.

A problem with using a magnesium ball is that it only allows pressure to be maintained in the well fluid from above, and only when the ball is on the collar. Furthermore, the corrosion of the magnesium ball is not readily controllable in that it may start to corrode as soon as it enters the well, which may lead to an insufficient seal on the aforementioned collar. In addition, with such an arrangement a restriction in the well is still present after the magnesium ball has been removed, which means that the full bore of the pipework is not useable for fluid flow.

It is also known to provide a downhole dissolvable plug for the well pipe. A problem with such a plug is that it may not dissolve sufficiently quickly when required to be removed from the pipe, or it may degrade when deployed into the well. Furthermore, the dissolving of the plug may be dependent on temperature, which leads to a less controlled removal of the plug. The plug may also corrode when not required to do so, and may not provide the required seal or blocking of the pipe. A further problem is that a plug may provide a blocking obstacle if it flows downstream starting to dissolve and being completely dissolved. The plug may also become stuck in the pipework leading to additional cost and time to retrieve or remove it.

A further problem is that with known systems, limited means are provided for initiating dissolution of the plug, and more options are required. Whereas other ways of temporarily blocking the pipework are known they generally add risk to operation of the well, and increase costs. In addition, such temporary blocking methods may shock the well formation in an undesirable manner upon activation (e.g. in the event of failure of the ball/seat upon pressurization), or may damage filters that protect the formation leading to damage of Electrical Submersible Pumps (ESPs) upon start up.

It is broadly an object of the present invention to address one or more of the above mentioned disadvantages of the previously known apparatus.

SUMMARY

What is required is an apparatus which may reduce or minimize at least some of the above-mentioned problems.

According to a first aspect of the invention, there is provided a degradable plug device for a pipe having an outer plug body and an inner plug for preventing fluid flow through the pipe until the inner plug has been removed from the outer plug body, the outer plug body and the inner plug being of a degradable material, the inner plug having a chamber with at least one port to the exterior or the inner plug, the exposed surfaces of the degradable plug having a protective layer thereon, wherein the inner plug is disposable in at least a first position, in which the inner plug prevents said fluid flow through the pipe, and is adapted to undergo, in use, a degradation initiation operation such that fluid is able to enter the chamber via the at least one port to initiate corrosion or dissolution of the inner plug from inside the chamber.

Such a device provides the advantage that the plug device can be made to dissolve quickly when required to do so, for example, by controlling the position of the first port and thereby the ingress of fluid into the chamber, or by controlling the composition of the degradable material.

The chamber and/or the at least one port may comprise one or more bores of the inner plug. The chamber and/or the at least one port may comprise a plurality of bores that intersect each other. Preferably the one or more bores are radial bores of the inner plug. In one embodiment, the inner plug has three radial bores.

According to an alternative characterisation of a first aspect of the invention, there is provided a degradable plug device for a pipe having an outer plug body and an inner plug for preventing fluid flow through the pipe until the plug device has been removed from the pipe or until the inner plug has been removed from the outer plug body, the outer plug body and the inner plug being of a degradable material, the exposed surfaces of the degradable plug having a protective layer thereon, wherein the inner plug is disposable in at least a first position, in which the inner plug is in sealing contact with the outer plug body so as to define a chamber, the inner plug being adapted to undergo, in use, a degradation initiation operation such that fluid is able to enter the chamber to initiate corrosion or dissolution of the inner plug and/or the outer plug body from inside the chamber.

Preferably, the outer plug body is cup-shaped. In said first position, the inner plug may be disposed at the mouth of the cup-shaped outer plug body, thereby forming the chamber.

In one embodiment, the degradation initiation operation comprises moving the inner plug relative to the outer plug body between the first position and a second position, in which fluid is able to enter the chamber to initiate corrosion or dissolution of the inner plug from inside the chamber.

Preferably the outer plug body and the inner plug are connected to each other with a shear device. The shear device may be a shear ring, a shear pin, or a shear sleeve. This ensures that the inner plug is retained in position and further assists in controlling the timing of dissolution initiation.

The shear device may be made of the degradable material or a non-degradable material. This ensures that the shear device dissolves when required to do so.

In one embodiment, the inner plug is adapted to move out of the first position when a pressure of the fluid on one side of the inner plug exceeds a first pressure threshold.

Therefore, the movement can be readily remotely controlled by varying the pressure adjacent the inner plug from a distal end of the pipe. In one embodiment, the first pressure threshold is between 1300 to 206800 kPa, and in one embodiment approximately 31000 kPa.

In another embodiment, the inner plug is adapted to move out of first position when a force applied by an actuating member to one side of the inner plug exceeds a force threshold. This advantageously facilitates remote actuation and control of plug dissolution by application of physical force direct to the plug, for example by remotely operated hammer or rod.

Preferably, the shear device is adapted to fail when the pressure of the fluid on one side of the inner plug exceeds the first pressure threshold or when the force applied to the one side of the inner plug exceeds the second force threshold. Thus, further control is provided, and avoidance of untimely/premature movement of the inner plug is prevented, through appropriate choice of the threshold at which the shear device fails.

In one embodiment, the inner plug is adapted, upon failure of the shear device, to be released from the outer plug body.

In another embodiment, the inner plug is adapted, upon failure of the shear device, to move a predetermined distance relative to the outer plug body. The predetermined distance may be in the range 5 to 25 cm. Accordingly, where desired, consequent falling of the inner plug into the fluid flow, potentially causing an undesirable blockage downstream, can be avoided.

In the case of the above alternative characterisation, after release; or after movement by the predetermined distance, the inner plug is free of the outer plug body and resides within the outer plug body.

Preferably, in the second position, fluid is able to enter the chamber via the at least one port. This influx enables the amount of surface area of the inner plug with which the fluid is in contact to be increased/maximised, thereby speeding up dissolution.

Preferably, 'O' ring seals are provided between the outer plug body and the inner plug to provide a seal there between. This assists in controlling the start point of dissolution by preventing ingress of the fluid until the appropriate initiation operation has occurred.

Preferably, the 'O' ring seals comprise a first 'O' ring seal axially disposed between the at least one port and a first side of the inner plug and a second 'O' ring seal axially disposed between the at least one port and a second side of the inner plug, which is opposite the first side.

Preferably, the predetermined distance is such as to move the at least one port from a position where the at least one port is disposed between 'O' ring seals, to a position in which the at least one port is not disposed between 'O' ring seals, whereby the chamber is in communication with the interior of the pipe. This assists with allowing pressure to be maintained on one side of the plug device prior to the inner plug being removed from the outer plug body.

Preferably, the inner plug has an outer circumferential recess to connect with the at least one port, or to connect the one or more bores at an outer circumference of the inner plug.

In embodiments, (i) the internal surface of the chamber is uncoated with the protective layer and/or (ii) only the internal surface of the inner plug is uncoated with the protective layer and all surfaces of the outer plug body are coated with the protective layer.

Preferably, the protective layer comprises a corrosion-inhibiting coating. Advantageously, this prevents any corrosion/dissolution from occurring until the initiation operation is performed by an operator.

In another embodiment, the degradation initiation operation comprises at least partially removing, in use, the protective layer at or near one end of the inner plug, thereby initiating corrosion or dissolution of the degradable material through contact with the fluid. Thus, in a vertically oriented pipe in a well, the upper part of the inner plug (nearest the surface) may be scraped or punctured by a remotely operated tool such as an abrasive member; and in this arrangement, further insurance is provided that no corrosion/dissolution occurs until the remotely operated tool is used.

Preferably, in use, after the inner plug has been removed from the outer plug body, the exposed regions of the outer plug body are in contact with the fluid, thereby initiating corrosion or dissolution of the outer plug body. An advantage is that both parts of the plug are dissolved, with a slight delay between commencement of corrosion or dissolution for each part. This can ensure plug removal while decreasing the chances of unwanted blocking downstream.

Preferably, the inner plug and/or the outer plug body are of magnesium.

The outer plug body may include an outer recess for receiving, in use, a portion of an anti-rotation ring disposed between the pipe and the outer plug body, to thereby prevent or inhibit rotation of the outer plug body within the pipe. Such an arrangement is may be useful in the event that the plug device fails to operate, and is required to be machined out of the pipework by milling.

The outer plug body may include at least two seal circumferential recesses, each of the two seal circumferential recesses being adapted for receiving, in use, a respective 'O' ring disposed between the pipe and the outer plug body, to thereby provide a seal between the outer plug body and the pipe. The two seal circumferential recesses may be disposed at axial positions on either side of the anti-rotation ring.

In embodiments, an outer portion of the outer plug body has an external profile corresponding in opposite shape to an internal seat profile on an internal bore of the pipe. Preferably, the external profile is substantially convex. The outer plug body may have a larger outer diameter than the internal bore of the pipe.

The shear device may comprise at least one split ring. Preferably the shear device comprises two split rings. The shear rings are springy and biased in a closed condition. The shear device may further comprise a continuous ring, such that the two split rings and the continuous ring are nested together. Such an arrangement provides a ready way for the shear ring to be operable.

Preferably the shear ring is at least partially within an outer circumferential recess of the inner plug and an internal recess of the outer plug body. Preferably the outer circumferential recess of the inner plug has an inclined opening, and each of the split rings have matching inclined surfaces which abut the inclined opening of the recess.

Preferably upon movement of the inner plug relative to the outer plug body the inclined surfaces engage one another to expand a diameter of at least one of the split rings to thereby break the continuous ring to release the inner plug from the outer plug body. Such an arrangement provides a ready way for movement of the inner plug to break the shear ring.

In one embodiment the outer plug body comprises two ring portions which abut each other and have a common axis. Preferably the two ring portions abut each other at the internal recess of the outer plug body. Such an arrangement assists with assembly of the plug device.

In one embodiment the outer plug body comprises a tube. Preferably one end of the tube is closed by the inner plug. Preferably another end of the tube is closed by an end cap. In one embodiment the end cap and the outer plug body comprise a single part.

Preferably the end cap is adapted to undergo, in use, a degradation initiation operation such that fluid is able to enter the chamber to initiate corrosion or dissolution of the end cap, the outer plug body, and/or the inner plug from inside the chamber.

Preferably the end cap and/or the inner plug is adapted to be removed from the outer plug body when the pressure of the fluid on one side of the end cap or the inner plug exceeds the first pressure threshold or when a force applied to the one side of the inner plug or the end cap exceeds the force threshold.

Preferably the inner plug is at one end of the tube. Preferably another end of the tube is closed by an end cap. Preferably the chamber comprises a ring-shaped space between the inner plug and the outer plug body.

In one embodiment the inner plug has a through-hole. Preferably the through-hole is in fluid communication with an inner space of the outer plug body. Preferably a mouth of the through-hole has a ball seat for location of a ball thereon to close the through-hole.

In one embodiment an outer surface of the degradable plug device comprises a slip assembly comprising one or more jaws and one or more sealing elements, the slip assembly for gripping, and sealing the degradable plug device within the pipe.

According to a second aspect of the invention, there is provided an apparatus for temporarily blocking flow of fluid through a pipe comprising a pipe defining a passage, the pipe having in the passage a degradable plug device according to any of claims 1 to 12 of the appended claims.

Such an apparatus provides the advantage that the flow of fluid in the pipe can readily be controlled such that upflow from a lower element in, for example, a well can be prevented until release of the plug through initiation of inner plug corrosion/dissolution under the control of an operator.

The apparatus may further include a shoulder in the pipe (for example mounted on the inner surface thereof). Preferably, after moving out of the first position the inner plug is retained on the shoulder of the pipe. This can advantageously ensure plug removal while decreasing the chances of unwanted blocking downstream.

In one embodiment, the apparatus comprises a plurality of pipe sections arranged and connected together, for example in a well. Preferably, a degradable plug device according to any of the claims 1 to 12 of the appended claims is arranged to be at an end of one or more pipe sections. In one embodiment, the apparatus further comprises a plurality of tubing anchors, at least one tubing anchor being disposed adjacent to a respective degradable plug.

In this way, the plug devices can be incorporated into the well as an integral part of the well completion, for example by having many plug devices along the pipework (i.e. the plug devices are introduced into the well with the pipework). A plug device would commonly be below a production packer (i.e. the tubing anchor) so that there are multiple zone completions that can be stimulated for hydrocarbon production, for example in fracturing operations. Once the completion is at the appropriate depth, the production packer is set (activated) by raising the pressure up against the plug device. Once the production packer is set and tested, the pressure on the well can be increased and the plug thereby "activated" (dissolution initiated) when required.

The apparatus may include an anti-rotation ring disposed between the pipe and the outer plug body, the anti-rotation ring being fixedly attached to the pipe and having a portion engaging, in use, an outer recess of the outer plug body, to thereby prevent or inhibit rotation of the outer plug body within the pipe. Preferably, an internal bore of the pipe has an internal location profile for locating, in use, the anti-rotation ring.

The apparatus may include at least two 'O' rings disposed between the pipe and the outer plug body, each 'O' ring being received, in use, in a respective one of the at least two seal circumferential recesses in the outer plug body, to thereby provide a seal between the outer plug body and the pipe. Preferably, two of the 'O' rings are disposed at different axial positions such that one is on either side of the anti-rotation ring.

In embodiments, an internal bore of the pipe has an internal seat profile for seating, in use, the outer plug body within the pipe. Preferably, the internal seat profile is between adjacent pipe sections of the pipe or at the junction thereof.

In embodiments, the internal bore of the pipe has a smaller diameter than an outer diameter of the outer plug body. Preferably, the internal seat profile comprises a recess. Preferably, the internal seat profile is substantially concave.

In use, the outer plug body may be unseated and freed from the internal seat profile by the application of fluid pressure in excess of a second pressure threshold that is different from the first pressure threshold. The second threshold may be between 1300 to 206800 kPa, and in one embodiment approximately 34500 kPa.

In embodiments, an internal bore of the pipe has an internal tool profile for locating, in use, tools to be used on the pipe.

According to a third aspect of the invention, there is provided a method of operating a degradable plug device for a pipe, the degradable plug device being in accordance with any of claims 1 to 12 of the appended claims, the method including: disposing the inner plug in at least a first position, in which the inner plug and/or the outer plug body prevents said fluid flow through the pipe; and performing a degradation initiation operation such that fluid is able to enter the chamber to initiate corrosion or dissolution of at least the inner plug from inside the chamber.

In one embodiment, performing said degradation initiation operation comprises moving the inner plug relative to the outer plug body between the first position and a second position, in which fluid is able to enter the chamber to initiate corrosion or dissolution of the inner plug from inside the chamber.

In one embodiment, moving the inner plug relative to the outer plug body comprises raising a pressure of the fluid on one side of the inner plug such that said pressure exceeds a first pressure threshold, to thereby move the inner plug out of the first position.

In another embodiment, moving the inner plug relative to the outer plug body comprises applying a force using an actuating member to one side of the inner plug such that the applied force exceeds a force threshold, to thereby move the inner plug out of the first position.

Preferably the outer plug body and the inner plug being connected to each other with a shear device, wherein raising the pressure of the fluid such that said pressure exceeds the first pressure threshold, or applying the force using the actuating member such that the applied force exceeds the force threshold causes the shear device to fail.

In one embodiment, the inner plug is released from the outer plug body upon failure of the shear device.

In another embodiment, the inner plug is moved a predetermined distance relative to the outer plug body upon failure of the shear device.

In the case of the above alternative characterization, after release, or after movement by the predetermined distance, the inner plug is free of the outer plug body and resides within the outer plug body.

Preferably, in the second position, fluid is able to enter the chamber via the at least one port.

Preferably, sealing between the outer plug body and the inner plug is provided by 'O' ring seals. Said sealing may comprise a first 'O' ring seal axially disposed between the at least one port and a first side of the inner plug, and a second 'O' ring seal axially disposed between the at least one port and a second side of the inner plug, which is opposite the first side. Preferably, the predetermined distance comprises moving the at least one port from a position where it is disposed between 'O' ring seals, to a position where it is not disposed between 'O' ring seals, such that the chamber is in communication with the interior of the pipe. This assists with allowing pressure to be maintained on one side of the plug prior to the inner plug being removed from the outer plug body.

Preferably, the method further includes using a corrosion-inhibiting coating as the protective layer.

In another embodiment, said performing the degradation initiation operation comprises at least partially removing the protective layer at or near one end of the inner plug, thereby initiating corrosion or dissolution of the degradable material through contact with the fluid.

Preferably the method further includes initiating corrosion or dissolution of the outer plug body after the inner plug has been removed from the outer plug body due to the exposed regions of the outer plug body being in contact with the fluid.

Preferably, the method includes forming the inner plug and/or the outer plug body of magnesium.

Preferably an anti-rotation ring is disposed between the pipe and the outer plug body the method including locating a portion of the anti-rotation ring in the plug body to thereby prevent or inhibit rotation of the outer plug body within the pipe.

In embodiments, the outer plug body includes at least two seal circumferential recesses, and the method may include locating a respective 'O' ring disposed between the pipe and the plug body in each of the two seal circumferential recesses, to thereby provide a seal between the outer plug body and the pipe.

In one embodiment the method includes assembling the degradable plug within the pipe comprising: locating one ring portion of the outer plug body within one pipe section; locating the split rings and the continuous ring into the outer circumferential recess of the inner plug; inserting the inner plug within the one ring portion of the outer plug body so that the split rings and the continuous ring are at least partially within the inner recess of the outer plug body; locating another ring portion over the inner plug so that the two ring portions abut one another; and locating another pipe section over the plug device.

Preferably the method includes installing the degradable plug device into the pipe as the pipe is being inserted in a well.

In another embodiment the method includes: deploying the degradable plug device into a pre-installed pipe within a well; and operating the slip assembly to grip and seal the degradable plug device within the pipe.

Preferably the method further includes removing the end cap or the inner plug from the outer plug body so that well fluid is able to enter the chamber. Preferably the method further includes removing the end cap and the inner plug so that fluid is able to pass through the outer plug body.

In one embodiment the method further includes locating the ball on the ball seat, and applying pressure to one side of the inner plug to move it so that well fluid is able to enter the chamber.

The method may further include locating one or more degradable plugs into the pipe, and locating the pipe into a well. Preferably, the method further includes activating a plurality of degradable plugs at different times by performing the degradation initiation operation to initiate production from the well. Preferably, the method includes activating the plurality of degradable plugs along the length of the pipe in succession.

Such a method provides the advantage that the plug device can be made to dissolve quickly, for example, by controlling the position of the port and thereby the ingress of fluid into the chamber.

According to an alternative characterization of the invention there is provided a degradable plug device for a pipe having an outer plug body with an inner plug, the outer plug body and the inner plug being of a degradable material, the plug device having a chamber, the outer plug body and the inner plug being connected to each other with a shear device, the exposed surfaces of the degradable plug device having a protective layer thereon to inhibit corrosion, wherein upon application of a threshold pressure or a force onto the inner plug the shear device fails permitting the inner plug to be moved relative to, or released from, the outer plug body to permit fluid to enter the chamber to initiate corrosion of the degradable plug device from inside the chamber, the plug device preventing fluid flow through the pipe until it has been degraded or the inner plug has been removed from the plug body.

According to another alternative characterization of the invention them is provided a degradable plug device for a pipe having an outer plug body with an inner plug, the outer plug body and the inner plug being of a degradable material, the plug device having a chamber, the exposed surfaces of the degradable plug device having a protective layer thereon to inhibit corrosion, wherein the plug device is adapted to undergo, in use, a degradation initiation operation such that fluid is able to enter the chamber to initiate corrosion or dissolution of the inner plug from inside the chamber.

According to another aspect of the invention there is provided a method of operating a degradable plug device according to the alternative characterizations of the invention.

According to another aspect of the invention there is provided an apparatus for temporarily blocking flow of fluid through a pipe according to the alternative characterizations of the invention.

According to another aspect of the invention, there is provided a degradable plug device for a pipe for preventing fluid flow through the pipe until the plug device has been removed from the pipe, the plug device comprising a body which is at least partially of a degradable material, the exposed surfaces of the degradable plug having a protective layer thereon, the body having a chamber therein, wherein the body is disposable in the pipe to prevent said fluid flow through the pipe, and is adapted to undergo a degradation initiation operation such that well fluid is able to enter the chamber to initiate corrosion or dissolution of the body from inside the chamber.

Such a degradable plug device permits the pipe to be temporarily blocking. The degradable plug device also provides the advantage that it is inhibited from corroding or dissolving and then it can be made to dissolve quickly (e.g. over time from one minute to weeks/months/years) when required to do so, for example, by undergoing a degradation initiation operation so that well fluid enters into the chamber, or by controlling the composition of the degradable material. Such an arrangement provides an improved removal of the plug from the pipe and decreases the chances of unwanted blocking of the pipework downstream. Furthermore, the plug provides the advantage that shock loading of the well formation due to a sudden burst of pressure is more readily controllable, which may also reduce or eliminate damage to the reservoir or filters of the well. After removal of the degradable plug device the full bore of the pipe can then be useable for fluid flow, which may help to improve production and operational costs of the well. Furthermore, the degradable plug device allows pressure to be maintained in the well fluid from above or below, which may provide additional operational advantages within the well.

Preferably the chamber has a corrosion agent therein which is provided in an un-activated form, said well fluid providing an activation of the corrosion agent to increase the rate of corrosion or dissolution of the body from inside the chamber. Such an arrangement provides the advantage that the body corrodes or dissolves more quickly upon activation of the corrosion agent by the well fluid.

Preferably the degradable plug further includes an actuation member, wherein the degradation initiation operation comprises puncturing of the body with the actuation member so that the well fluid is able to enter the chamber. Preferably the actuation member comprises a drop spear or a drop bar. Using an actuation member may further improve the corrosion or dissolving of the body.

Preferably the actuation member is at least partially comprised of a degradable material. Preferably the actuation member is of magnesium. Such an arrangement ensures that the actuation member cannot impede well operation after it has punctured the body.

The actuation member may have a hardened tip. In one embodiment the body has a weakened portion, the actuation member being able to puncture the body at the weakened portion. Such arrangements may assist with puncturing of the body to initiate corrosion or dissolution thereof.

Preferably the actuation member has a corrosion agent therein that is deliverable into the chamber upon puncturing of the body by the actuation member. Such an arrangement may release the corrosion agent from the actuation member on impact with body, which may improve the rate at which the body corrodes or dissolves.

Preferably the corrosion agent comprises an acid. Preferably the acid comprises citric acid. Such an acid provides the advantage that it is relatively easy to transport between different countries because it is not classed as a restricted substance.

In one embodiment the body comprises two parts that cooperate to define the chamber therebetween, one of the parts is cup-shaped and the other part is a cap to close an open mouth of the cup-shaped part. Preferably the two parts are of the degradable material so that the body is fully degradable. Such an arrangement is a convenient way of forming the chamber, and may provide a higher pressure rating.

In another embodiment the body comprises three parts that cooperate to define the chamber therebetween, one part comprising a tube of a non-degradable material, another part comprising a first cap to close an end of the tube, and another part comprising a second cap to close another end of the tube, the first and second caps comprising the degradable material. Such an arrangement provides the advantage that the non-degradable tube can be is seated between two portions of the pipe so that it is part of the well tubular.

Preferably the degradable material comprises magnesium. Such a material provides the required corrosion or dissolution together with the required structural integrity properties for the degradable plug device.

Preferably the chamber has at least one body port to an exterior of the body.

Preferably the body has an outer circumferential recess on an exterior thereof. Preferably the at least one body port is in fluid communication with the outer circumferential recess. Such arrangements provide a ready way for well fluid to enter the chamber to start the corrosion or dissolution.

Preferably the body has a shoulder for seating the body between two portions of the pipe. Such a feature of the body permits the degradable plug device to be positively held in place between adjacent pipe portions.

In one embodiment the degradable plug device further includes a controller which is operable to open an electromechanical valve of the at least one body port, said degradation initiation operation comprising operating the electromechanical valve using the controller so that the chamber is in fluid communication with the interior of the pipe such that well fluid is able to enter the chamber via the at least one body port to initiate corrosion or dissolution of the body from inside the chamber. Such a controller and electromechanical valve may provide a degradation initiation operation that is more readily controllable.

Preferably the electromechanical valve is provided in a sidewall of the pipe. Such an arrangement means that the electromechanical valve does not interfere with the bore of the pipe and avoids impeding the fluid flow therein.

In one embodiment at least one pipe port is provided in a side wall of the pipe, and at least one flow channel is provide between the at least one pipe port and the body port, or between the at least one pipe port and the outer circumferential recess. Such arrangements provide the at least one flow channel within the wall of the pipe such that it does not interfere with the bore of the pipe to avoid impeding the fluid flow therein.

In one embodiment operation of the electromechanical valve by the controller is provided at a predetermined time.

Such an arrangement provides the advantage of an automatic operation of the electromechanical valve.

In one embodiment operation of the electromechanical valve by the controller is provided by remote communication with the controller from a remote location, the remote communication with the controller being provided by a wire connection or a wireless connection with the remote location. Such an arrangement provides the advantage of remote operation the electromechanical valve when required, for example, from the surface.

In one embodiment the controller comprises a pressure operated device, and the wireless connection with the controller is provided by one or more pressure signals or acoustic signals from the remote location to the pressure operated device. Preferably the degradable plug device further includes one or more pressure or acoustic repeater units between the remote location and the pressure operated device. Such arrangements may provide a ready way to communicate with the controller.

In one embodiment the wireless connection with the controller is provided by one or more radio signals from the remote location to the controller. Preferably the degradable plug device further includes one or more wireless repeater units between the remote location and the controller. Such arrangements may provide a ready way to communicate with the controller.

In one embodiment the degradable plug device further includes at least one rupture device, said degradation initiation operation comprising operating the at least one rupture device by applying hydraulic pressure to the well fluid above a pressure threshold such that the at least one rupture device breaks so that the chamber is in fluid communication with the interior of the pipe to permit well fluid to enter the chamber via the at least one body port to initiate corrosion or dissolution of the body from inside the chamber. Such a rupture device may provide a degradation initiation operation that is more readily controllable.

Preferably the at least one rupture device is provided in a sidewall of the pipe. Such an arrangement means that the rupture device does not interfere with the bore of the pipe and avoids impeding the fluid flow therein.

In one embodiment at least one pipe port is provided in a side wall of the pipe, and at least one flow channel is provide between each pipe port and an associated body port, or between each pipe port and the outer circumferential recess. Such arrangements provide the at least one flow channel within the wall of the pipe such that it does not interfere with the bore of the pipe to avoid impeding the fluid flow therein.

In one embodiment the body has an outer sleeve thereon that is sealed to and axially slidable on an outside of the body, the outer sleeve covering the at least one body port, said degradation initiation operation comprising movement of the outer sleeve to provide the chamber in fluid communication with the interior of the pipe to permit well fluid to enter the chamber via the at least one body port to initiate corrosion or dissolution of the body from inside the chamber. Such an outer sleeve may provide a degradation initiation operation that is more readily controllable.

Preferably 'O' ring seals are provided between the body and the outer sleeve to provide the seal therebetween. Preferably the 'O' ring seals comprise a first 'O' ring seal axially disposed between the at least one port and a first side of the body, and a second 'O' ring seal axially disposed between the at least one port and a second side of the body which is opposite the first side. The seals assists in controlling the commencement of dissolution or corrosion by preventing ingress of the well fluid until the initiation operation has occurred.

Preferably the outer sleeve is sealed to and slidable relative to the pipe. Preferably 'O' ring seals are provided between the pipe and the outer sleeve to provide the seal therebetween. The seals assist in controlling the commencement of dissolution or corrosion by preventing ingress of the well fluid until the initiation operation has occurred.

In one embodiment said movement of the outer sleeve comprises axially sliding the outer sleeve relative to the body to uncover the at least one body port. In one embodiment the outer sleeve is at least partially rotatable on the outside of the body, the outer sleeve having one or more channels on the outer circumference thereof for location in a guide part of the pipe, the one or more channels to provide the chamber in fluid communication with the interior of the pipe upon rotation of the outer sleeve. Such movement of the outer sleeve provides additional options for commencement of the degradation initiation operation.

Preferably said movement of the outer sleeve is provided by applying a hydraulic pressure to the well fluid above a pressure threshold. Such application of hydraulic pressure provides a ready way to operate the sleeve.

In one embodiment the outer sleeve is biased in a predetermined position by a resilient member between the outer sleeve and the body. Such a resilient member may provide a convenient way to bias the sleeve against hydraulic pressure, and to set the pressure threshold.

In one embodiment an outer surface of the body comprises a slip assembly having one or more jaws and one or more sealing elements, the slip assembly for gripping and sealing the degradable plug device within the pipe. Such a slip assembly provides the advantage that the degradable plug device can be deployed into a well after pipe was already been installed in the well, which may provide additional operational advantages.

Preferably operation of the slip assembly is provided by said movement of the outer sleeve. In one embodiment said movement of the outer sleeve is provided by a setting device which is operated to grip the body and move the outer sleeve relative thereto. Such arrangements combine the setting and activation steps of the degradable plug device.

In one embodiment the at least one rupture device is provided in the outer sleeve. In one embodiment the at least one rupture device comprises a shear device. Preferably the shear device is a shear ring, a shear pin, or a shear sleeve. Preferably the shear device is made of the degradable material. Such a rupture device may provide a degradation initiation operation that is more readily controllable.

Preferably the protective layer comprises a corrosion-inhibiting coating.

In one embodiment the degradable plug device further includes an operating fluid in a region between the outer sleeve, the rupture device, and the pipe, wherein said applying hydraulic pressure to the well fluid above the pressure threshold causes the outer sleeve to transfer the hydraulic pressure to the at least one rupture device to break it and to permit the outer sleeve to move and uncover the at least one body port to provide the chamber in fluid communication with the interior of the pipe. Such an arrangement may permit the plug device to be operated with a greater actuation pressure which may be required in a particular well application.

Preferably the operating fluid is inert to inhibit corrosion or dissolution of the plug.

A channel may be provided in the shoulder to provide fluid communication between the outer sleeve and the at least one rupture device. A spacer ring may be provided between the shoulder and the rupture device. The spacer ring may have a channel to provide fluid communication to the at least one rupture device.

In one embodiment a sidewall of the pipe has a lower fluid channel between the at least one rupture device and a bleed port to an interior of the pipe, said operating fluid passing into the interior of the pipe upon breaking of the at least one rupture device.

In one embodiment a sidewall of the pipe has a pipe chamber in fluid communication with the at least one rupture device, said operating fluid passing into the pipe chamber upon breaking of the at least one rupture device.

According to a second aspect of the invention, there is provided an apparatus for temporarily blocking flow of fluid through a pipe comprising a pipe defining a passage, the pipe having in the passage a degradable plug device according to any of the claims 1-12.

Such an apparatus provides the advantage that the flow of fluid in the pipe can readily be controlled such that upflow from a lower element in the well can be prevented until activation of the plug by corrosion or dissolution thereof under the control of an operator.

In one embodiment, the apparatus comprises a plurality of pipe sections arranged and connected together, for example in a well. Preferably, a degradable plug device according to any of the claims 1 to 12 of the appended claims is arranged to be at an end of one or more pipe sections.

In this way, the plug devices can be incorporated into the well as an integral part of the well completion, for example by having many plug devices along the pipework (i.e. the plug devices are introduced into the well with the pipework). A plug device would commonly be below a production packer (i.e. the tubing anchor) so that there are multiple zone completions that can be stimulated for hydrocarbon production, for example in fracturing operations. Once the completion is at the appropriate depth, the production packer is set (activated) by raising the pressure up against the plug device. Once the production packer is set and tested, the pressure on the well can be increased and the plug thereby "activated" (dissolution initiated) when required.

Preferably an internal bore of the pipe has an internal seat profile for seating, in use, at least a part of the body within the pipe. Preferably the internal seat profile is between adjacent pipe sections of the pipe or at the junction thereof, and the internal seat profile receives the shoulder of the body. Such a feature of the body permits the degradable plug device to be positively held in place between adjacent pipe portions.

Preferably the internal bore of the pipe has a smaller diameter than an outer diameter of the body. This allows the full bore of the pipe to be utilised after the plug device has been removed from the pipe.

According to a third aspect of the invention, there is provided a method of operating a degradable plug device for a pipe, the degradable plug device being according to any of claims 1 to 12, the method including: disposing the plug in the pipe so that fluid flow through the pipe is prevented; and performing a degradation initiation operation such that fluid is able to enter the chamber to initiate corrosion or dissolution of the body from inside the chamber.

Such a method provides the advantage that the pipe can be temporarily blocked. The method also provides the advantage that the degradable plug device is inhibited from corroding or dissolving and then it can be made to dissolve quickly (e.g. over time from one minute to weeks/months/years) when required to do so, for example, by undergoing a degradation initiation operation so that well fluid enters into the chamber, or by controlling the composition of the degradable material. Such a method provides an improved removal of the plug from the pipe and decreases the chances of unwanted blocking of the pipework downstream. Furthermore, the method provides the advantage that shock loading of the well formation due to a sudden burst of pressure is more readily controllable, which may also reduce or eliminate damage to the reservoir or filters of the well. After removal of the degradable plug device the full bore of the pipe can then be useable for fluid flow, which may help to improve production and operational costs of the well. Furthermore, the method allows pressure to be maintained in the well fluid from above or below, which may provide additional operational advantages within the well.

Preferably the method further includes using the well fluid to provide said activation of the corrosion agent to increase the rate of corrosion or dissolution of the body from inside the chamber. Such an arrangement provides the advantage that the body corrodes or dissolves more quickly upon activation of the corrosion agent by the well fluid.

In one embodiment the method includes said degradation initiation operation comprising puncturing of the body with the actuation member so that the well fluid enters the chamber. Using an actuation member may further improve the corrosion or dissolving of the body.

Preferably the method further includes puncturing the body at the weakened portion using the actuation member. Such arrangements may assist with puncturing of the body to initiate corrosion or dissolution thereof.

Preferably the method further includes delivering the corrosion agent to the chamber using the actuation member when the body is punctured by the actuation member. Such an arrangement may release the corrosion agent from the actuation member on impact with body, which may improve the rate at which the body corrodes or dissolves.

In one embodiment the method further includes fully corroding or dissolving the body. Such an arrangement is a convenient way of removing the plug when require to do so.

In one embodiment the method further includes fully corroding or dissolving the two caps. Such an arrangement provides the advantage that the non-degradable tube can be is seated between two portions of the pipe so that it is part of the well tubular.

Preferably the method further includes seating the body between two portions of the pipe. Such a feature of the body permits the degradable plug device to be positively held in place between adjacent pipe portions.

In one embodiment the method further includes said degradation initiation operation comprising operating the electromechanical valve using the controller to open the at least one body port so that well fluid enters the chamber to initiate corrosion or dissolution of the body from inside the chamber. Such a method may provide a degradation initiation operation that is more readily controllable.

In one embodiment the method further includes operating the electromechanical valve at the predetermined time. Such a method provides the advantage of an automatic operation of the electromechanical valve.

In one embodiment the method further includes operating the electromechanical valve from the remote location using the remote communication with the controller. Such an arrangement provides the advantage of remote operation the electromechanical valve when required, for example, from the surface.

In one embodiment the method further includes using one or more pressure signals or acoustic signals from the remote location to communicate with the controller. Such arrangements may provide a ready way to communicate with the controller.

In one embodiment the method further includes using one or more radio signals from the remote location to communicate with the controller. Such arrangements may provide a ready way to communicate with the controller.

In one embodiment the method further includes said degradation initiation operation comprising applying hydraulic pressure to the well fluid above a pressure threshold to break the at least one rupture device so that well fluid enters the chamber to corrode or dissolve the body from inside the chamber. Such a method may provide a degradation initiation operation that is more readily controllable.

In one embodiment the method further includes said degradation initiation operation comprising moving the outer sleeve so that well fluid enters the chamber to corrode or dissolve the body from inside the chamber. Such a method may provide a degradation initiation operation that is more readily controllable.

In one embodiment the method further includes axially sliding or rotating the outer sleeve relative to the body to uncover the at least one body port. Such movement of the outer sleeve provides additional options for commencement of the degradation initiation operation.

Preferably the method further includes moving the outer sleeve by applying the hydraulic pressure to the well fluid above the pressure threshold. Such application of hydraulic pressure provides a ready way to operate the sleeve.

In one embodiment the method further includes deploying the degradable plug device into a pre-installed pipe within a well, and operating the slip assembly to grip and seal the degradable plug device within the pipe. Such a slip assembly provides the advantage that the degradable plug device can be deployed into a well after pipe was already been installed in the well, which may provide additional operational advantages.

Preferably the method further includes operating the slip assembly by said movement of the outer sleeve. In one embodiment the method further includes moving the outer sleeve relative to the body using the setting device. Such arrangements combine the setting and activation steps of the degradable plug device.

Preferably the method further includes using a corrosion-inhibiting coating as the protective layer.

In one embodiment the method further includes assembling the degradable plug within the pipe, and locating another pipe section over the plug device. Preferably the method further includes installing the degradable plug device into the pipe as the pipe is being inserted in a well.

Preferably the method further includes locating one or more degradable plugs into the pipe, and locating the pipe into a well. In this way, the plug devices can be incorporated into the well as an integral part of the well completion (i.e. the tubing, the casing or an accessory to the drill pipe and the coil tubing), for example by having many plug devices along the pipework (i.e. the plug devices are introduced into the well with the pipework).

In one embodiment the method further includes venting said operating fluid into the interior of the pipe upon breaking of the at least one rupture device. In one embodiment the method further includes venting said operating fluid into the pipe chamber upon breaking of the at least one rupture device.

In one embodiment the method further includes storing clean well fluid in the pipe in a region above the degradable plug device, and releasing the clean well fluid into the pipe in a region below the degradable plug device when the plug device is removed from the pipe or when the plug device is at least partially corroded or dissolved. Such an arrangement permits flushing operations to be performed in the well.

According to an alternative characterisation of the invention there is provided a degradable plug device for a pipe for preventing fluid flow through the pipe until the plug device has been removed from the pipe, the plug device comprising a body which is at least partially of a degradable material, the exposed surfaces of the degradable plug having a protective layer thereon, the body having a chamber with a corrosion agent therein in an un-activated form, wherein the body is disposable in the pipe to prevent said fluid flow through the pipe, and is adapted to undergo a degradation initiation operation such that fluid is able to enter the chamber to activate the corrosion agent to initiate corrosion or dissolution of the body from inside the chamber.

According to another aspect of the invention, there is provided a method of operating a degradable plug device for a pipe, the degradable plug device being according to the alternative characterisation(s) of the invention, the method including: disposing the plug in the pipe so that fluid flow through the pipe is prevented; and performing a degradation initiation operation such that fluid is able to enter the chamber to initiate corrosion or dissolution of the body from inside the chamber.

According to another aspect of the invention there is provide an apparatus for temporarily blocking flow of fluid through a pipe according to the alternative characterisation(s) of the invention.

According to another aspect of the invention there is provided a degradable plug device for a pipe for preventing fluid flow through the pipe until the degradable plug device has been removed from the pipe, the degradable plug device comprising: a body which is at least partially comprised of a degradable material, wherein exposed surfaces of the degradable plug device comprise a protective layer thereon, and the body comprises a chamber therein, and wherein the body is disposable in the pipe to prevent said fluid flow through the pipe, and the body is adapted to undergo a degradation initiation operation such that well fluid is able to enter the chamber to initiate corrosion or dissolution of the body from inside the chamber.

In an embodiment the chamber comprises a corrosion agent therein which is provided in an un-activated form, said well fluid providing an activation of the corrosion agent to increase a rate of corrosion or dissolution of the body from inside the chamber.

In an embodiment the degradable plug device further comprises an actuation member, wherein the degradation initiation operation comprises puncturing of the body with the actuation member so that the well fluid is able to enter the chamber.

In an embodiment, the actuation member comprises a corrosion agent therein that is deliverable into the chamber upon puncturing of the body by the actuation member.

In an embodiment, the body comprises two parts that cooperate to define the chamber therebetween, wherein one of the two parts is cup-shaped and the other of the two parts is a cap to close an open mouth of the cup-shaped part.

In an embodiment, the body comprises three parts that cooperate to define the chamber therebetween, one of the three parts comprising a tube of a non-degradable material, a second of the three parts comprising a first cap to close an end of the tube, and a third of the three parts comprising a second cap to close another end of the tube, the first and second caps comprising the degradable material.

In an embodiment, the chamber comprises at least one body port to an exterior of the body, and the body comprises an outer circumferential recess on an exterior thereof.

In an embodiment, the at least one body port is in fluid communication with the outer circumferential recess.

In an embodiment the degradable plug device further comprises a controller which is operable to open an electromechanical valve of the at least one body port, said degradation initiation operation comprising operating the electromechanical valve using the controller so that the chamber is in fluid communication with an interior of the pipe such that the well fluid is able to enter the chamber via the at least one body port to initiate corrosion or dissolution of the body from inside the chamber.

In an embodiment the degradable plug device further comprises at least one rupture device configured to rupture via application of a hydraulic pressure to the well fluid above a pressure threshold during said degradation initiation operation, such that the at least one rupture device breaks so that the chamber is in fluid communication with an interior of the pipe to permit the well fluid to enter the chamber via the at least one body port to initiate corrosion or dissolution of the body from inside the chamber.

In an embodiment the body comprises an outer sleeve thereon that is sealed to and axially slidable on an outside of the body, the outer sleeve covering the at least one body port, wherein the outer sleeve is configured to move during said degradation initiation operation to uncover the at least one body port and provide the chamber in fluid communication with an interior of the pipe to permit the well fluid to enter the chamber via the at least one body port to initiate corrosion or dissolution of the body from inside the chamber.

In an embodiment an outer surface of the body comprises a slip assembly having one or more jaws and one or more sealing elements, the slip assembly for gripping and sealing the degradable plug device within the pipe.

According to a further aspect of the invention there is provided a method of operating a degradable plug device for a pipe, wherein the degradable plug device comprises a body which is at least partially of a degradable material, exposed surfaces of the degradable plug device comprise a protective layer thereon, and the body comprises a chamber therein, the method including: disposing the degradable plug device in the pipe so that fluid flow through the pipe is prevented; and performing a degradation initiation operation such that well fluid is able to enter the chamber to initiate corrosion or dissolution of the body from inside the chamber.

In an embodiment the chamber of the degradable plug device comprises a corrosion agent therein which is provided in an un-activated form, and the method further comprises: using the well fluid to activate the corrosion agent to increase the rate of corrosion or dissolution of the body from inside the chamber.

In an embodiment the degradable plug device comprises an actuation member, and the degradation initiation operation comprises puncturing the body with the actuation member so that the well fluid enters the chamber.

In an embodiment the actuation member comprises a corrosion agent therein, and the method further comprises delivering the corrosion agent to the chamber using the actuation member when the body is punctured by the actuation member.

In an embodiment the chamber comprises at least one body port to an exterior of the body, and a controller which is operable to open an electromechanical valve of the at least one body port, and the method further comprises: operating the electromechanical valve using the controller during the degradation initiation operation to open the at least one body port so that the well fluid enters the chamber to initiate corrosion or dissolution of the body from inside the chamber, In an embodiment the degradable plug device further comprises at least one rupture device, and said degradation initiation operation comprises: applying hydraulic pressure to the well fluid above a pressure threshold to break the at least one rupture device so that the well fluid from an interior of the pipe enters the chamber via the at least one body port to corrode or dissolve the body from inside the chamber.

In an embodiment the body comprises an outer sleeve thereon that is sealed to and axially slidable on an outside of the body, the outer sleeve covering the at least one body port, and the degradation initiation operation further comprises: moving the outer sleeve to uncover the at least one body port and so that the well fluid enters the chamber via the at least one body port to corrode or dissolve the body from inside the chamber.

In an embodiment an outer surface of the body comprises a slip assembly having one or more jaws and one or more sealing elements, and the method further comprises: deploying the degradable plug device into a pre-installed pipe within a well, and operating the slip assembly to grip and seal the degradable plug device within the pre-installed pipe.

Any preferred or optional features of one aspect or characterization of the invention may be a preferred or optional feature of other aspects or characterizations of the invention.

BRIEF DESCRIPTION OF THE DRAWINGS

Other features of the invention will be apparent from the following description of preferred embodiments shown by way of example only with reference to the accompanying drawings, in which;

FIGS. 4(a), 4(b) and 4(c) show a plug device according to a second embodiment;

FIG. 13 shows a schematic cross section of a pipe with a plug device according to another embodiment;

FIG. 14 shows a schematic cross section of the embodiment shown in FIG. 13;

FIG. 15 shows a schematic cross section of the embodiment shown in FIG. 14;

FIG. 16 shows a schematic cross section of a plug device according to another embodiment;

FIG. 17 shows a schematic cross section of a pipe with a plug device according to another embodiment;

FIG. 17a shows a detail of the embodiment shown in FIG. 17;

DETAILED DESCRIPTION

Figure 2:
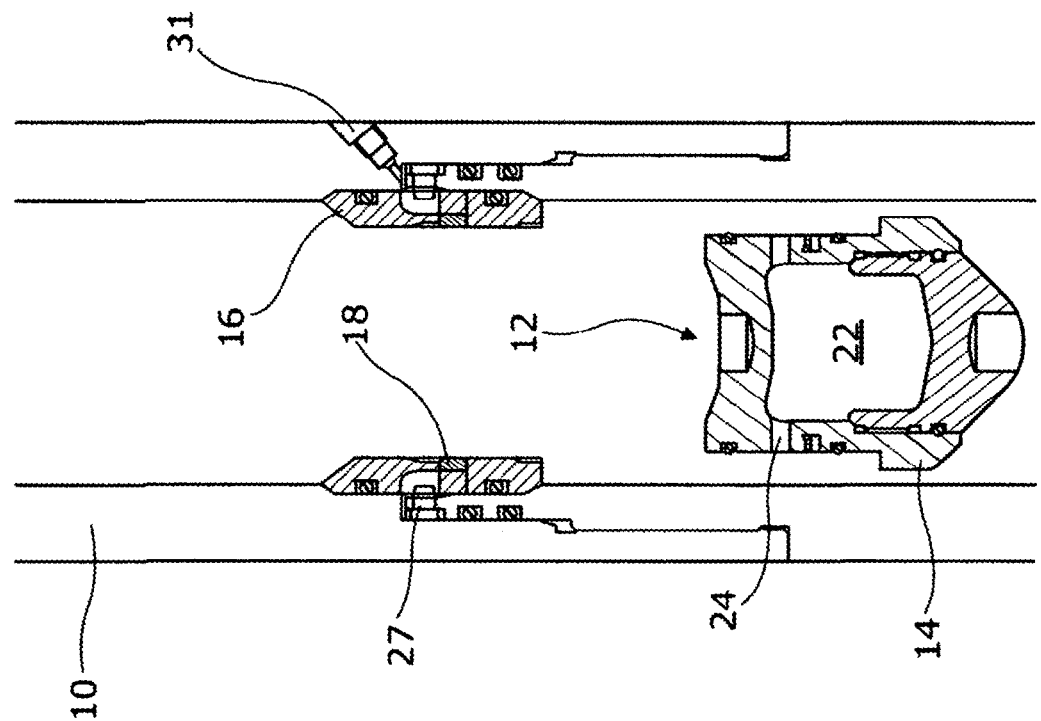
FIG. 2 shows a view of the apparatus shown in FIG. 1 with the plug device in an open condition.
Figure 1:
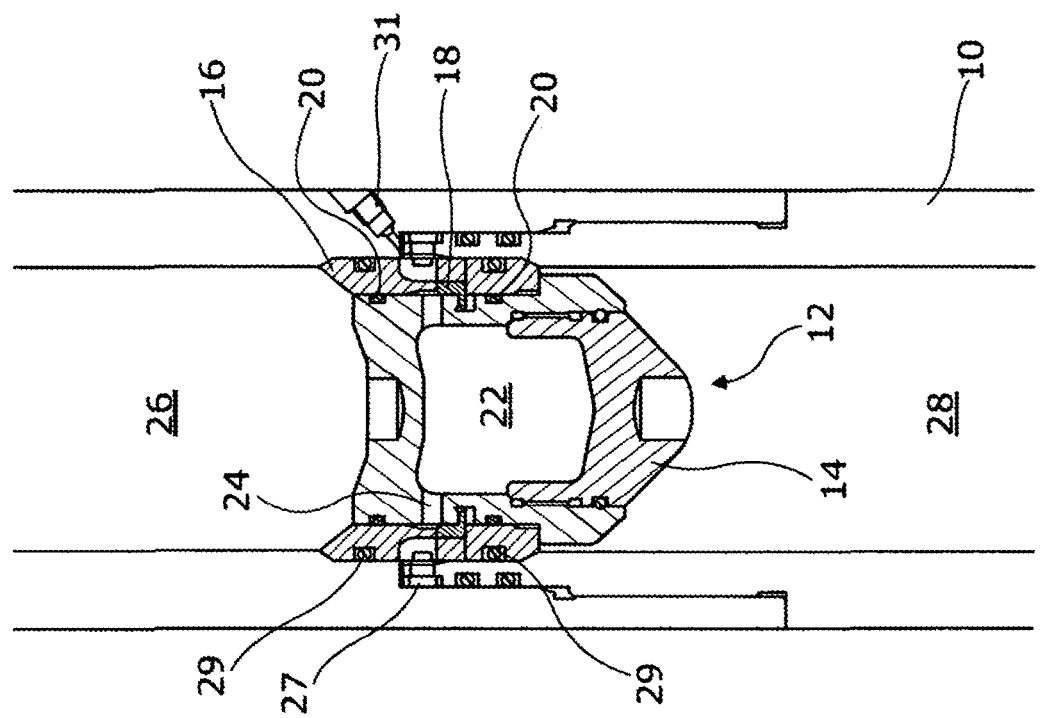
FIG. 1 shows a schematic cross section of a pipe with a plug device according to a first embodiment of the invention.

FIG. 1 shows a schematic cross section of a pipe 10 with a plug device 12 according to a first embodiment of the invention. FIG. 2 shows a view of the apparatus shown in FIG. 1 with the plug device 12 in an open condition. In FIG. 2 like features to the arrangements of FIG. 1 are shown with like reference numerals. In FIGS. 1 and 2 the pipe 10 is comprised of two parts and the plug device 12 is located in a region between the two parts. A typical length of the plug device 12 might be 10 cm. The plug device 12 comprises an inner plug 14, which is retained in a plug body 16 by a shear ring 18. The inner plug 14 is sealed to the plug body 16 with two 'O' rings 20 which are either side of the shear ring 18. The inner plug 14 has a chamber 22, which is accessible by well fluid via first ports 24 as described below with reference to FIG. 2. The inner plug 14 comprises two pieces which are sealed together to for the chamber 22 between the two pieces.

The plug device 12 is primarily made of magnesium or similar disintegrable material. When the plug device 12 is in situ in the pipe 10, as shown in FIG. 1, the surfaces of the plug device 12 that can come into contact with well fluid, i.e. in the regions above 26 and below 28 the plug device 12, have a coating (i.e. a protective layer) that is resistant to corrosion. The internal surfaces of the chamber 22 and the plug body 16 are uncoated so that they can be exposed to well fluid as described below with reference to FIG. 2.

"Degradable" is intended to mean that the inner plug 14 and/or plug body 16 is disintegrable, dissolvable, weakenable, corrodible, consumable, or otherwise removable. It is to be understood that use herein of the term "degrade", or any of its forms, incorporates the stated meaning. For example, the inner plug 14 and/or plug body 16 could be made from magnesium, aluminum, controlled electrolytic metallic materials, described in more detail below, etc. and degradable upon exposure to one or more fluids available or deliverable downhole, such as water, brine, acid, oil, etc. By exposing the inner plug 14 and/or plug body 16 core to a specified downhole fluid, the inner plug 14 can be removed without an intrusive, costly, or time-consuming operation such as milling.

Each of the inner plug 14 and the outer plug body 16 effectively comprise an inner core coated in a protective layer. Materials appropriate for the purpose of degradable cores include magnesium, aluminium, controlled electrolytic metallic materials, etc. The controlled electrolytic materials as described herein are lightweight, high strength metallic materials. Examples of suitable materials and their methods of manufacture are given in US2011/0135953. These lightweight, high-strength and selectably and controllably degradable materials include fully-dense, sintered powder compacts formed from coated powder materials that include various lightweight particle cores and core materials having various single layer and multilayer nanoscale coatings. These powder compacts are made from coated metallic powders that include various electrochemically-active (for example having relatively higher standard oxidation potentials) lightweight, high-strength particle cores and core materials, such as electrochemically active metals, that are dispersed within a cellular nanomatrix formed from the various nanoscale metallic coating layers of metallic coating materials, and are particularly useful in borehole applications. Suitable core materials include electrochemically active metals having a standard oxidation potential greater than or equal to that of Zn, including as Mg, Al, Mn or Zn or alloys or combinations thereof. For example, tertiary Mg—Al—X alloys may include, by weight, up to about 85% Mg, up to about 15% Al and up to about 5% X, where X is another material. The core material may also include a rare earth element such as Sc. Y, La, Ce, Pr, Nd or Er, or a combination of rare earth elements. In other embodiments, the materials could include other metals having a standard oxidation potential less than that of Zn. Also, suitable non-metallic materials include ceramics, glasses (for example, hollow glass microspheres), carbon, or a combination thereof. In one embodiment, the material has a substantially uniform average thickness between dispersed particles of about 50 nm to about 5000 nm. In one embodiment, the coating (protective) layers are formed from Al. Ni, W or $Al_2O_3$, or combinations thereof. In one embodiment, the coating is a multi-layer coating, for example, comprising a first Al layer, an $Al_2O_3$ layer, and a second Al layer. In some embodiments, the coating may have a thickness of about 25 nm to about 2500 nm.

These powder compacts provide an advantageous combination of mechanical strength properties, such as compression and shear strength, low density, and selectable and controllable corrosion properties, particularly rapid and controlled dissolution in various borehole fluids. The fluids may include any number of ionic fluids or highly polar fluids, such as those that contain various chlorides. Examples include fluids comprising potassium chloride (KCl), hydrochloric acid (HCl), calcium chloride (CaCl2), calcium bromide (CaBr,) or zinc bromide (ZnBr2). For example, the particle core and coating layers of these powders may be selected to provide sintered powder compacts suitable for use as high strength engineered materials having a compressive strength and shear strength comparable to various other engineered materials, including carbon, stainless and alloy steels, but which also have a low density comparable to various polymers, elastomers, low-density porous ceramics and composite materials.

During use of the plug device 12 as shown in FIG. 1, the 'O' rings 20 prevent the well fluid from entering the uncoated chamber 22 of the inner plug 14, or the uncoated surface of the plug body 16. When a predetermined hydraulic pressure is applied from above in the region 26, the shear ring 18 fails and the inner plug 14 is free to pass through the plug body 16, so that it is free to drop into the well as shown in FIG. 2. The well fluid can then contact the uncoated surfaces of the plug device 12, i.e. the internal surfaces of the chamber 22 and the uncoated surface of the plug body 16, so that corrosion and rapid dissolving thereof can begin. It will be appreciated that well fluid enters the chamber 22 via the first ports 24.

Returning to FIGS. 1 and 2, in this embodiment the inner plug 14 drops into the well. In an alternative arrangement, the inner plug 14 is retained on a shoulder (not shown) of the pipe 10 to prevent it dropping down the pipe 10 into the well. Such an arrangement is intended to allow the inner plug 14 to more fully dissolve in the well fluid that is present near to the initial location of the plug device 12, which may not be present at a deeper region of the well. When the inner plug 14 is removed or free from the outer plug body 16, the pipe 10 is open so that well fluid can pass through it. It can be seen most clearly form FIG. 2 that the outer plug body 16 is a ring that is inserted between two sections of the pipe 10, and the inner plug 14 is within the ring.

FIGS. 3(*a*) and 3(*b*) show alternative embodiments of an apparatus comprising a pipe 10 and plug devices 12 according to the embodiment of FIG. 1. According to embodiments, the plug device 12 can be run into a well as an integral part of the well completion, for example by having many plug devices 12 along the pipework (i.e. the plug devices are introduced into the well with the pipework). A plug device 12 would commonly be below a production packer (i.e. the tubing anchor) 30, so that there are multiple zone completions that can be stimulated for hydrocarbon production. Once the completion is at depth, the production packer 30 is set by pressuring up against the plug device 12. Once the production packer 30 is set and tested, pressure on the well can be increased, and the plug device 12 "activated" when required.

In the embodiments of FIGS. 3(*a*) and 3(*b*), the well pipe 10 is formed by successive pipe sections 10*a*, 10*b*, and 10*c*. For illustration, only three pipe sections 10*a*-10*c* are shown, and it will be appreciated by skilled persons that many more sections may be used.

In the embodiment of FIG. 3(*a*), respective plug devices 12*a* and 12*b* are positioned at lower ends 32*a* and 32*b* of pipe sections 10*a* and 10*b* of pipe 10. In addition, respective production packers 30*b* and 30*c* are provided at upper ends 34*b* and 34*c* of pipe sections 10*b* and 10*c*. Here, plug devices may be "activated" (dissolved/opened) in succession, for example, whereby plug device 12*b* is opened, enabling extraction via production packer 30*c*, and then later plug device 12*a* is opened, enabling extraction via production packer 30*b*.

In the embodiment of FIG. 3(*b*), respective plug devices 12*b* and 12*c* are positioned at upper ends 34*b* and 34*c* of pipe sections 10*b* and 10*c* of pipe 10. In addition, respective production packers 30*a* and 30*b* are provided at lower ends 32*a* and 32*b* of pipe sections 10*a* and 10*b*. Here, plug devices may be "activated" (dissolved/opened) in succession, for example, whereby plug device 12*c* is opened, enabling extraction via production packer 30*c* (not shown), and then later plug device 12*b* is opened, enabling extraction via production packer 30*b*.

Figure 3A:
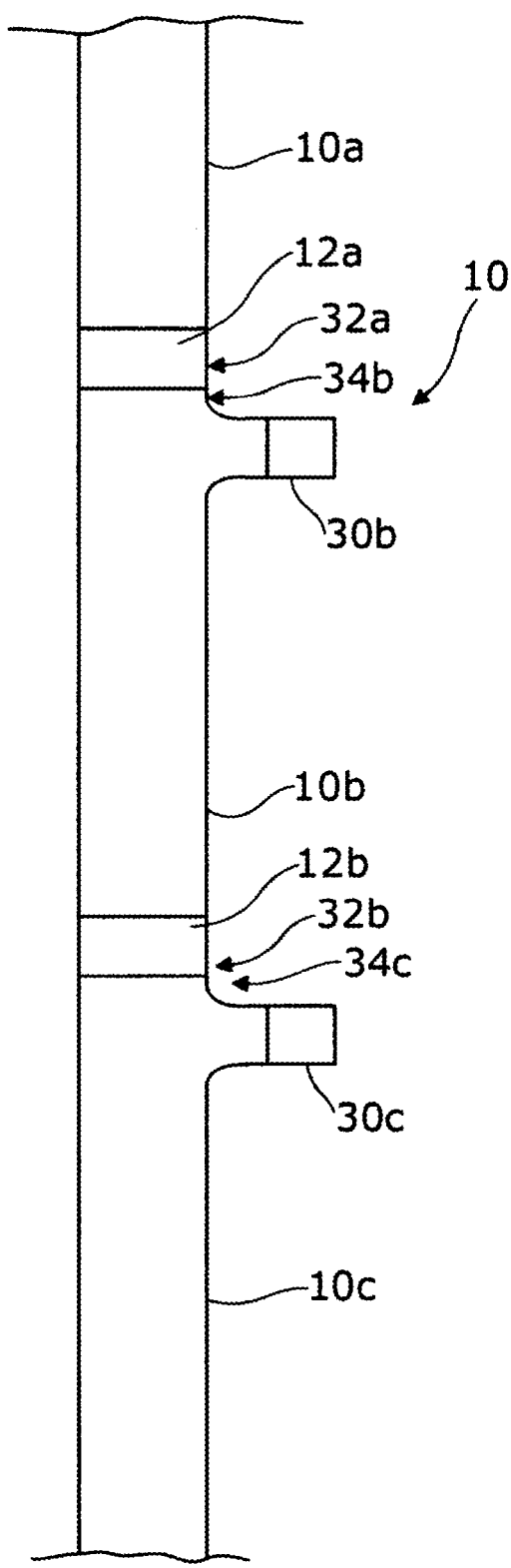
FIGS. 3(a) and 3(b) show alternative embodiments of an apparatus comprising a pipe and plug devices according to the embodiment of FIG. 1.
Figure 3B:
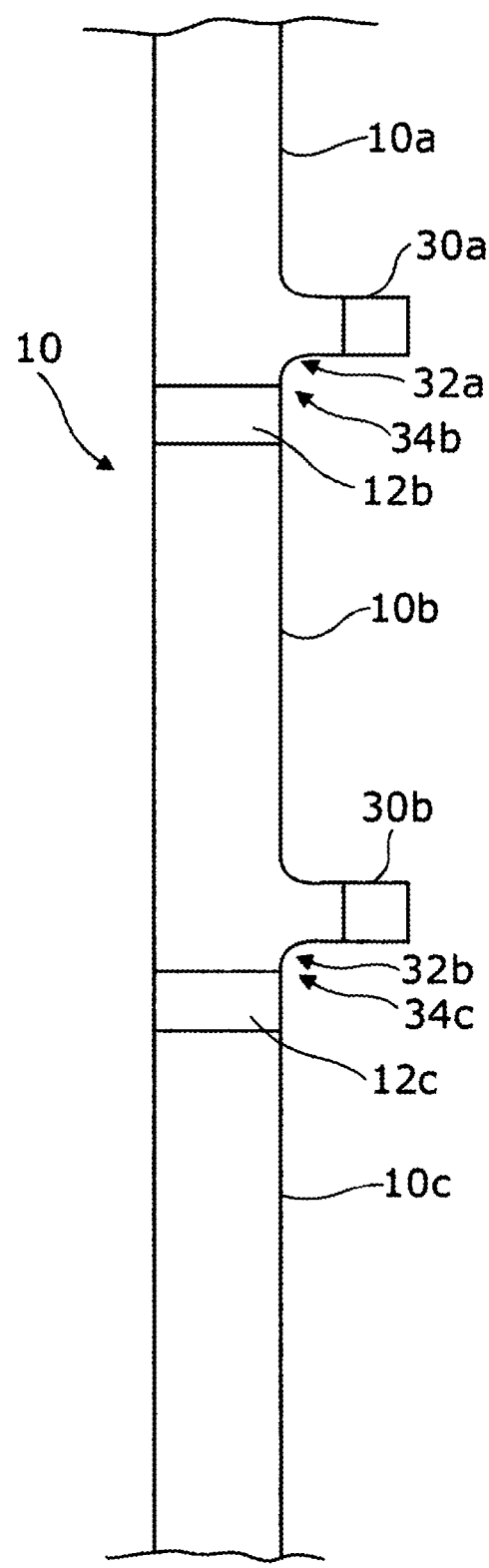

In either of the embodiments shown in FIG. 3*a* or 3*b* the pipe sections 10*a*, 10*b*, 10*c* may be filled with fluid (i.e. sea water) from the top (i.e. above the sea) as the pipe sections 10*a*, 10*b*, 10*c* are run into the well, or they may "self-fill" when the pipe sections 10*a*, 10*b*, 10*c* are in situ in the well.

FIGS. 4(*a*), 4(*b*) and 4(*c*) show a plug device according to a second embodiment, generally designated 13. In FIGS. 4(*a*), 4(*b*) and 4(*c*) like features to the arrangements of FIGS. 1 and 2 are shown with like reference numerals. In FIGS. 4(*a*) and 4(*b*) the chamber 22 of the inner plug 14 comprises three radial bores 23 that intersect each other at the centre of the inner plug 14 to form the chamber 22. The inner plug 14 also has an outer circumferential recess 25 (see FIG. 4*b*) to connect the radial bores 23 at an outer circumference of the inner plug 14. It will be appreciated that there may be more or less than three radial bores 23 to form the chamber 22. The one or more radial bores may be termed one or more ports. Such an arrangement of radial bores 23 is a convenient way to form the chamber 22 so that the inner plug 14 can be manufactured from a single piece of magnesium or similar disintegrable material.

Also shown in FIG. 4*a* is an anti-rotation ring 27 between the pipe 10 and the plug body 16, which prevents the plug body 16 from rotation in the pipe 10. The anti-rotation ring 27 may be useful in the event that the plug device 13 fails to operate, and is required to be machined out of the pipe 10 by milling. Without the anti-rotation ring 27 the plug device 13 may rotate within the pipe 10 during milling thereby preventing or inhibiting unblocking of the pipe 10. FIGS. 4*a* and 4*b* also show that the plug body 16 is sealed to the pipe 10 with two 'O' rings 29 which are either side of the anti-rotation ring 27. Each 'O' ring 20, 29 is in a respective seal circumferential recess of the outer plug body or the inner plug 14. A similar anti-rotation ring 27 and two 'O' rings 29 are shown in the embodiment of FIGS. 0.1 and 2.

FIGS. 4*a* and 4*b* also show a first port 31 in the pipe 10, which is in communication with the chamber 22 via a second port 33 in the plug body most clearly shown in FIG. 4*b*. The ports 31, 33 are used to perform pressure tests of the plug device 13 when in situ in the pipe 10 to ensure that the various parts thereof are seated correctly. A similar port 31 is shown in the embodiments of FIGS. 1 and 2 for the same purpose.

FIG. 4(*b*) shows the plug device 13 after the predetermined pressure has been applied from above in the region 26 so that the inner plug 14 is free of the plug body 16. Well fluid then enters the chamber 22 via the radial bores 23 and also contacts the exposed surfaces of the plug body 16 to initiate the corrosion process as previously described. The inner plug 14 is then free to fall into the well under gravity. It will be appreciated that if the pipe 10 is horizontal the inner plug. 14 may reside in the pipe 10 near to the plug body 16.

FIG. 4(*c*) shows that when the plug body 16 has been removed by corrosion there is a first internal profile 35 (i.e. nipple profile) on an internal bore of the pipe 10. The internal profile 35 seats the plug body 16 within the pipe 10 between adjacent pipe sections 7, 9. The internal profile 35 can be used as a location point for other tools to perform further tasks after the inner plug 14 and the plug body 16 have been removed from the pipe 10.

These tasks might be for example, remedial work within the pipe such as additional milling or machining that may be required.

Also shown in FIG. 4(*c*) are two additional internal profiles 37, 39 (i.e. nipple profiles) on the internal bore of the pipe 10. Whereas the internal profile 39 is shown to be below where the plug device 13 is situated, in another arrangement the internal provide 39 may be above the plug device 13 to assist with remedial removal of the plug device 13 or other intervention operations that may be required. The internal profile 37 is a recess in which the anti-rotation ring 27 is located. The anti-rotation ring 27 is also located in an outer recess of the outer plug body 16. The internal profile 37 may alternatively be termed an internal location profile. The internal profile 39 is another location point below the plug device 13. The internal profile 39 may alternatively be termed an internal tool profile. Both internal profile 37, 39 can be used as location points for other tools to perform further tasks as required.

Figure 5A:
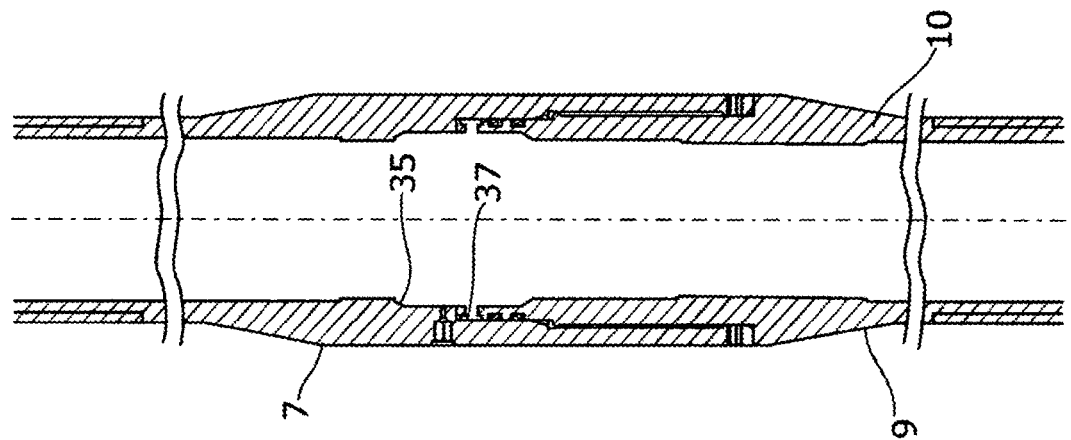
FIGS. 5(a), 5(b) and 5(c) show a plug device according to a third embodiment.
Figure 5B:
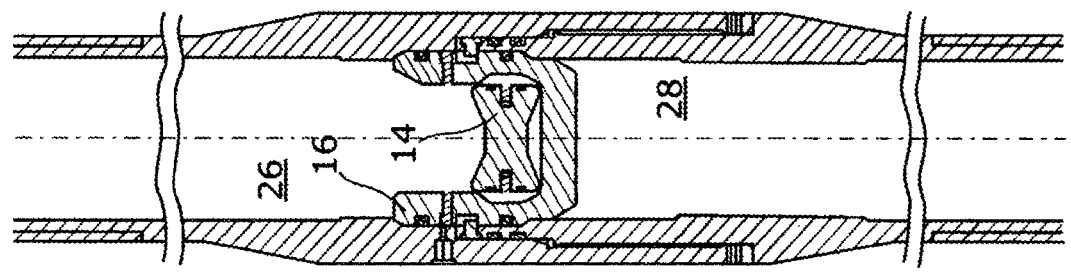
Figure 5C:
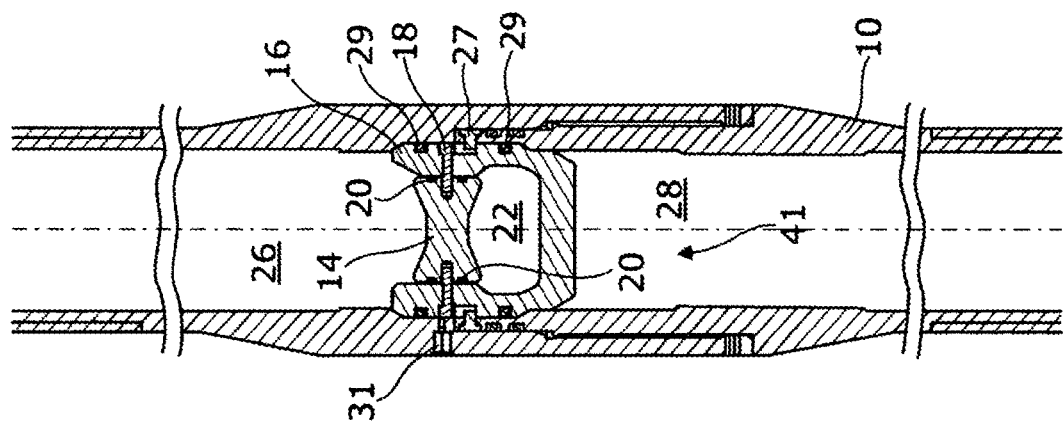

FIGS. 5(*a*), 5(*b*) and 5(*c*) show a plug device according to a third embodiment, generally designated 41. In FIGS. 5(*a*), 5(*b*) and 5(*c*) like features to the arrangements of FIGS. 1, 2, 4(*a*), 4(*b*) and 4(*c*) are shown with like reference numerals. In FIGS. 5(*a*), 5(*b*) and 5(*c*) the plug body 16 is a cup with the inner plug 14 being at a mouth of the cup such that the chamber 22 is formed between the inner plug 14 and the plug body 16. The inner plug 14 is retained in the plug body 16 with the shear ring 18 as shown in FIG. 5(*a*). In the embodiments of FIGS. 5(*a*) and 5(*b*) it will be appreciated that the chamber 22 is formed between the inner plug 14 and the plug body 16.

In the embodiment of FIGS. 5(*a*) and 5(*b*) the inner plug 14 and the plug body 16 are solid and of magnesium or similar disintegrable material. The internal surfaces of the chamber 22 may be uncoated. In one arrangement only the internal surface of the inner plug 14 is uncoated with all surfaces of the plug body 16 being coated. Such an arrangement for the chamber 22 is a convenient way to form the chamber 22 and avoids additional machining of the plug device 41. In FIG. 5(*b*) it will be appreciated that whereas the fluid is able to enter the chamber 22 to initiate corrosion or dissolution from inside the chamber 22, it will be understood that the chamber 22 may no longer be present as such, and the well fluid merely contacts the uncoated surfaces that comprised the chamber 22.

FIG. 5(*b*) shows the plug device 41 after the predetermined pressure has been applied from above in the region 26 so that the shear ring 18 fails and the inner plug 14 is free of the plug body 16 and resides within the cup of the plug body 16. In the position shown in FIG. 5(*b*) the inner plug 14 has been moved by about 1.5 cm, but it will be appreciated that the inner plug 14 may move by a different amount, such as between 0.5 to 2 cm, or 0.5 to 1.5 cm, or 1.0 to 1.5 cm. Well fluid then contacts the uncoated surfaces of the chamber 22 that was formed between the inner plug 14 and the plug body 16 to initiate the corrosion process as previously described. With such an arrangement the inner plug 14 is retained in the plug body 16 so that it does not fall into the well under gravity. Furthermore, the inner plug 14 is maintained in the region of the well where well fluid (i.e. brine) is present to initiate corrosion. Such an arrangement allows the inner plug 14 to more fully dissolve in the well fluid that is present near to the initial location of the plug device 12, which may not be present at a deeper region of the well.

The arrangements of FIGS. 5(*a*) and 5(*b*) allow a pressure seal to be maintained from below in the region 28 whilst the inner plug 14 is dissolved over a period of typically two to three days, although a longer or a shorter period is also envisaged. This allows pressure to be applied from above in the region 26, or from below in the region 28, to perform tasks within the well for a few days before over-pressuring in the region 26 to push the inner plug 14 and the plug body 16 out of the pipe as shown in FIG. 5(*c*). In one arrangement the pressure required to push the inner plug 14 into the position shown in FIG. 5(*b*) might be 4500 PSI (approx. 31000 kPa), and the pressure required to push the inner plug 14 and the plug body 16 out of the pipe 10 might be 5000 PSI (approx. 34500 kPa). In another arrangement the pressure required to push the inner plug 14 into the position shown in FIG. 5(*b*) might be between 200 to 30000 PSI (approx. 1300 to 206800 kPa). It will be understood that such pressure are for a particular temperature rating, such as up to 250. degree. C. in these embodiments. The pressure required will typically depend on well conditions and the particular application required. The arrangements of FIGS. 5(*a*), 5(*b*) and 5(*c*) allow further options for operations and tasks within the well for example, performing pressure testing of the pipework or setting the production packer as required.

FIG. 5(*c*) shows the internal profiles 35, 37 (i.e. nipple profile) on the internal bore of the pipe 10 when the plug body 16 has been removed by applying pressure to the region 26, which can be used as location points for other tools to perform further tasks as required.

It can be seen from FIGS. 4(*c*) and 5(*c*) that the internal profile 35 has a shape that corresponds to an outer shape of the plug body 16. The plug body 16 is substantially convex. The internal profile 35 may alternatively be an internal seat profile.

It will be appreciated that the plug devices 12, 13, 41, shown in FIGS. 1, 2, 4, and 5 are required to be fitted between two adjacent pipe sections 7, 9 because the plug body 16 has a larger diameter than the internal bore of the pipe 10. Accordingly, the plug body 16 is located in a recess in the internal bore of the pipe such as provided by the internal profile 35. Without such a recess the plug body 16 would not be able to be fitted in the pipe 10.

The embodiments of FIGS. 1, 2, 4 and 5 show that the inner plug 14 can be either pushed out of the plug body 16, or retained within the plug body 16 as required by a particular application in a well.

In the embodiments described above, the inner plug 14 is separated from the plug body 16 by applying hydraulic pressure in the region 26. In an alternative arrangement, the inner plug 14 is separated from the plug body 16 by inserting a hammer or rod into the well, so that it pushes the inner plug 14 and breaks the shear ring 18, and that inner plug 14 is separated from the plug body 16. In another alternative arrangement, the protective coating of an upper part of the inner plug 14 may be scraped or punctured, so that the brine in the region 26 comes into contact with the magnesium and starts the corrosion process. Such an arrangement may provide additional advantages and uses for the plug device 12, 13, 41.

It will be appreciated that if the plug device 12, 13, 41 was entirely made of uncoated magnesium, it would start to corrode immediately on contact with well fluid. Through the use of the coatings on the various parts of the plug device 12, 13, 41 it is possible to prevent corrosion of the magnesium alloy, and to provide a more controlled corrosion and operation of the plug device 12, 13, 41.

The above embodiments of the plug device 12, 13, 41 provides the advantage that the unblocking of the pipe 10 can be more readily controlled. The plug device 12, 13, 41 provides a more positive way to control the unblocking of a pipe 10, and in effect operates as a valve device to open part of the well. The plug device 12, 13, 41 may alternatively be termed a valve device or a barrier device. It is envisaged that with the embodiments of the invention the plug device 12, 13, 41 may be in situ in the well for a period of 2 to 3 years, and possibly up to 10 years, before being activated to release the inner plug 14 from the plug body 16. It will be appreciated that after activation the time taken to degrade the inner plug 14 and plug body 16 may depend on the material thickness, fluid type and temperature etc.

Figure 6:
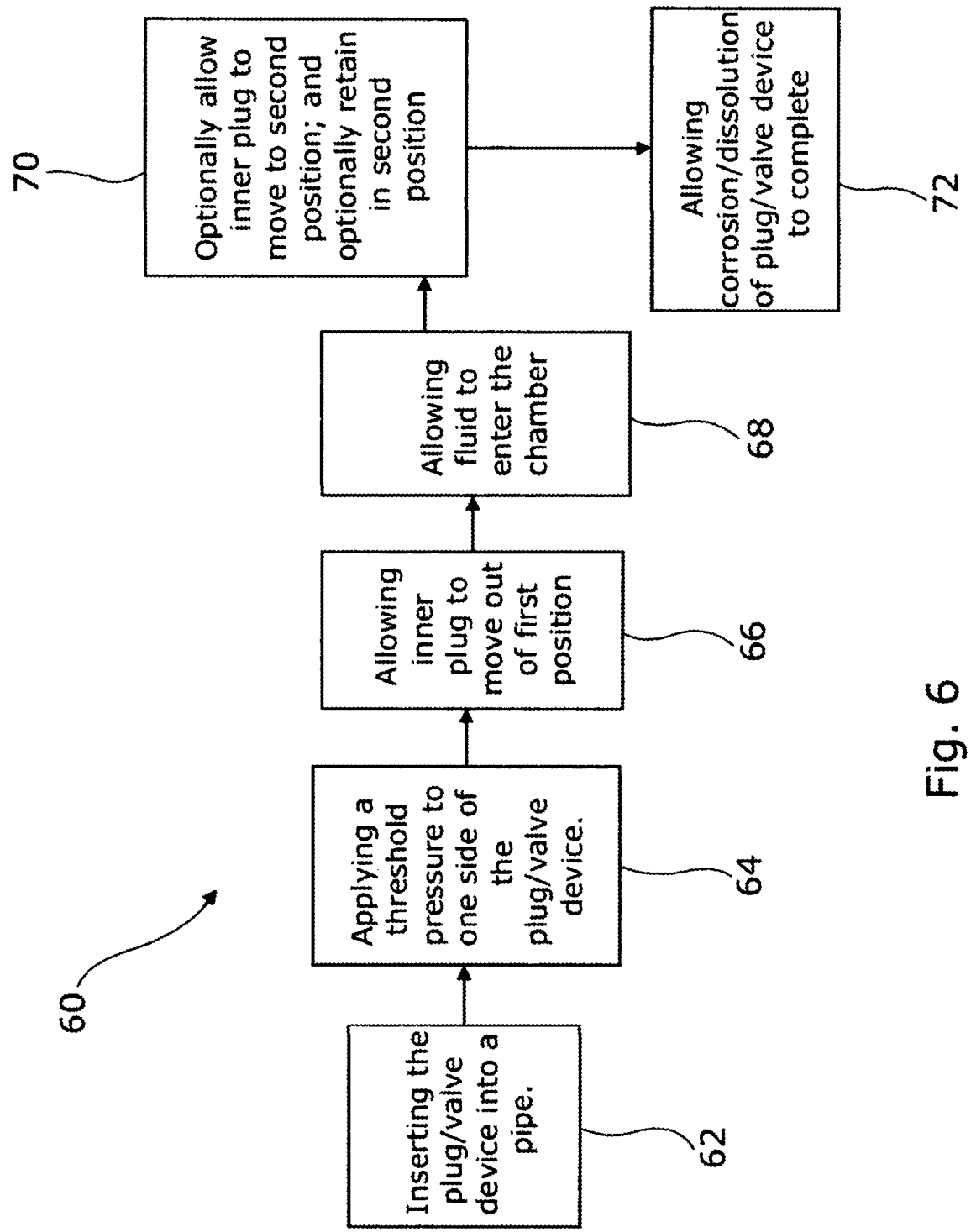
FIG. 6 shows steps of a method according to an embodiment of the invention.

FIG. 6 shows steps of a method according to an embodiment of the invention, generally designated 60. It will be appreciated that the steps may be performed in a different order, and may not necessarily be performed in the order shown in FIG. 6. In FIG. 6, step 62 shows inserting the plug device 12, 13, 41 into a pipe 10. Thereafter, at step 64, force or pressure is applied to one side of the plug device 12, 13, 41, and assuming this is above the threshold force or pressure required, it will cause release of the inner plug 14 (FIG. 2) from the first (pipe blocking) position (FIG. 1). This is followed (step 66) by allowing inner plug to move out of first position. Consequently, inner plug 14 is moved so that port 24 (FIG. 2) is now in communication with the interior of the pipe 10, whereby fluid is allowed (step 68) to enter chamber 22 (FIG. 2).

Optionally, thereafter, the inner plug 14 is allowed (step 70) to move to second position; and optionally the inner plug 14 is retained in the second position (FIG. 2). Finally, corrosion/dissolution of plug device 12, 13, 41 is allowed to complete (step 70). It will be appreciated that the plug device 12, 13, 42 prevents fluid flow through the pipe until it has been degraded or the inner plug 14 has been removed from the outer plug body 16.

In FIGS. 2 and 4b the inner plug 14 can be adapted, upon failure of the shear ring 18, to move a predetermined distance relative to the plug body 16, and optionally retained on a shoulder (not shown) of the pipe 10 to prevent it dropping down the pipe 10 into the well. In embodiments the predetermined distance may between 0.5 to 2 cm, or 0.5 to 1.5 cm, or 1.0 to 1.5 cm, or 5 to 25 cm.

In the above embodiments reference is made to the shear ring 18. It will be understood that other arrangements may be used to connect the plug body 16 and the inner plug 14 together such as a shear pin or a shear sleeve. Such arrangements may be termed a shear device. The shear device may be made of the degradable material or a non-degradable material, which ensures that the shear device can be dissolved when required.

Figures 7A, 7B, 7C:
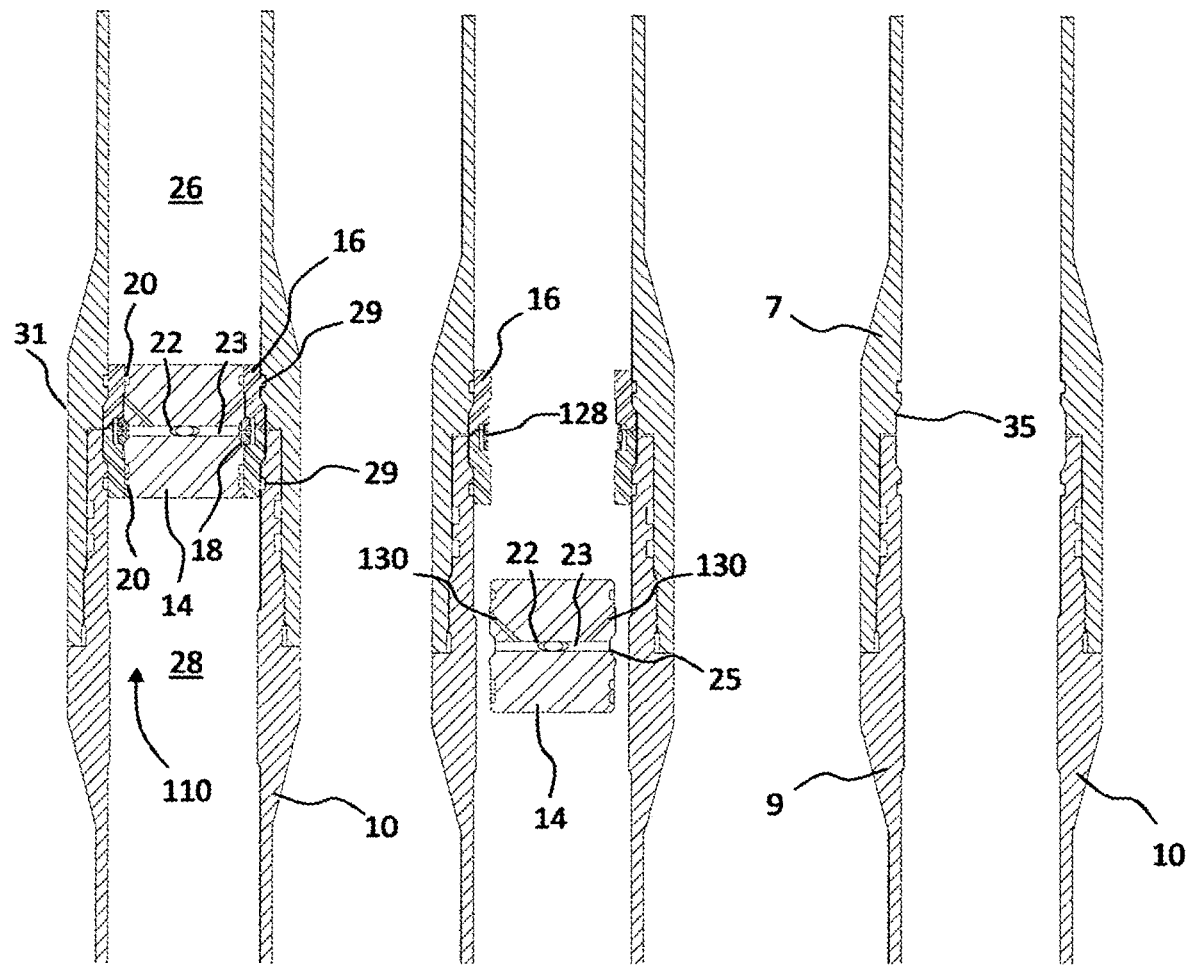
FIGS. 7(a), 7(b) and 7(c) show a plug device according to an embodiment of the invention.
Figure 8:
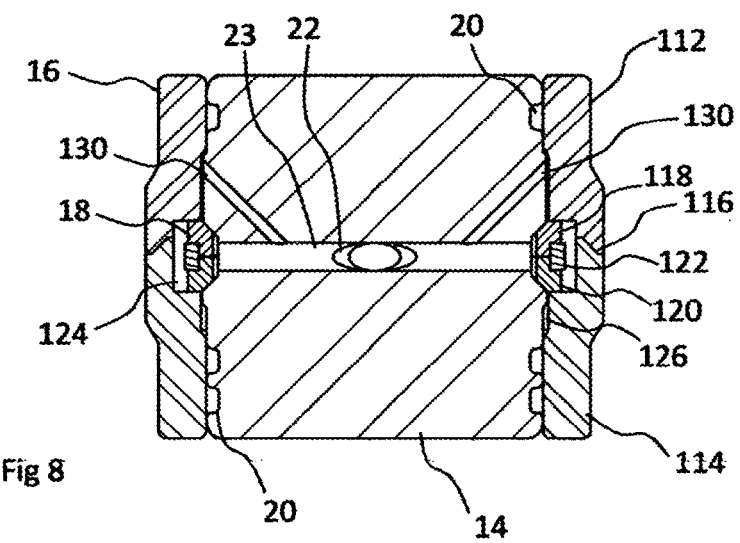
FIG. 8 shows an enlarged view of the plug device of FIG. 7.

FIGS. 7(a), 7(b) and 7(c) show a plug device according to another embodiment, generally designated 110. FIG. 8 shows an enlarged view of the plug device 110 of FIG. 8. The embodiment of FIGS. 7 and 8 is similar to the embodiment of FIGS. 4(a), 4(b) and 4(c) but with certain differing features as mentioned below. Like features to the arrangements of FIGS. 1, 2, 4(a), 4(b) and 4(c) are shown with like reference numerals. In FIGS. 7 and 8 the plug body 16 is shown to comprise a first portion 112 and a second portion 114 to assist with assembly of the plug device 110. The first and second portions 112, 114 of the plug body 16 are two rings that abut each other as shown at 116. The first and second portions 112, 114 have a common axis and are adjacent to one another on the common axis so that the wall of the plug body 16 is continuous. In other words, the common axis is a common axis of rotation, and the continuous plug body 16 comprises a wall of the first and second portions 112, 114. An external surface of the first and second portions 112, 114 nests within the internal profile 35 of the pipe which seats the plug body 16 in the pipe 10 between adjacent pipe sections 7, 9. The first and second portions 112, 114 may be termed ring portions.

FIG. 8 also shows that the shear ring 18 comprises three parts, which are two split rings 118, 120 and one continuous ring 122 to assist with assembly of the plug device 110, and to provide the required shearability of the shear ring 18. Each of the split rings 118, 120 have a small gap at some location along their circumference so that they have a degree of resilience or springiness in the plane of each split ring 118, 120. In other words, each of the split rings 118, 120 has an expandable diameter (i.e. circumference) so that they are springy. The split rings 118, 120 and the continuous ring 122 are nested together in the outer circumferential recess 25 of the inner plug 14 and in an internal recess 124 of the plug body 16. The outer circumferential recess 25 of the inner plug 14 has an inclined opening such that it is flared or chamfered outwards, and each of the split rings 118, 120 have a matching inclined surface which abuts the inclined opening of the recess 25.

In operation the inner plug 14 is pushed downwards relative to the plug body 16, for example by applying an increased pressure from above in the region 26. As the inner plug moves downwards the inclined surfaces of the recess 25 and the split ring 118 engage each other and expand the diameter (i.e. circumference) of the split ring 118. The split ring 118 then acts on the continuous ring 122 and breaks it so that the inner plug 14 is then able to travel downwards so that it is free of the plug body 6 as shown in FIG. 7(b). In FIG. 8 a space 126 is shown between the plug body 16 and the inner plug 14, which readily permits the inner plug 14 to move relative to the plug body 16 when the split ring 118 is being expanded. Also shown in FIG. 7(b) are the remains 128 of the shear ring 18 within the internal recess 124 of the plug body 16.

FIG. 8 also shows that the chamber 22 of the inner plug 14 comprising one or more radial bores 23 that intersect each other at the centre of the inner plug 14 to form the chamber 22 in a similar manner to the arrangement of FIGS. 4a), 4(b) and 4(c). The one or more radial bores may be termed one or more ports. In FIG. 8 the inner plug 14 also has two inclined channels 130 which provide additional fluid communication between the chamber 22 and the exterior of the inner plug 14 as shown in FIG. 7(b).

In a similar manner to the previous embodiments, the plug device 110 is made of a degradable material and the exposed surfaces of the plug device 110 that are in contact with well fluid as shown in FIG. 7(a) are coated so that they are protected from the corrosive effect of the well fluid. The internal surfaces of the plug device 110 are uncoated such that when the plug device 110 has been activated as shown in FIG. 7(b) the well fluid enters the chamber 22 via the ports/radial bores 23 and the channels 130. The well fluid contacts the unprotected surfaces of the plug device 110 (i.e. the internal surface of the plug body 16, the inner plug 14, the shear ring 18) to initiate the corrosion process as previously described. The inner plug 14 is then free to fall into the well under gravity. It will be appreciated that if the pipe 10 is horizontal the inner plug 14 may reside in the pipe 10 near to the plug body 16.

The embodiment of FIGS. 7 and 8 can be readily assembled such that the portion 114 of the plug body 16 is first located into the pipe section 9. The split ring 120 is then expanded and located in the outer circumferential recess 25 of the inner plug 14. The continuous ring 122 is then nested with the split ring 120, and the split ring 118 is expanded and nested with the continuous ring 122 in the recess 25. The inner plug 14 with the assembled shear ring 18 on it is then inserted into the portion 114 so that the shear ring 18 is within the internal recess 124 of the plug body 16. The portion 112 of the plug body 16 is then located over the inner plug 14, and then the pipe section 7 is located over the portion 112.

It will be appreciated that whereas the embodiment of FIGS. 7 and 8 does not have an anti-rotation ring 27 between the pipe 10 and the plug body 16, such an arrangement could be readily provided if required in a similar manner to the embodiments of FIGS. 4 and 5 to prevent the plug body 16 of the embodiment of FIGS. 7 and 8 from rotation in the pipe 10.

The method of operating the plug device 110 of FIGS. 7 and 8 includes assembling the degradable plug 110 within the pipe 10 comprising locating one ring portion 114 of the outer plug body 16 within one pipe section 9, locating the split rings 118, 120 and the continuous ring 122 into the outer circumferential recess 25 of the inner plug 14, inserting the inner plug 14 within the one ring portion 114 of the outer plug body 13 so that the split rings 118, 120 and the continuous ring 122 are at least partially within the inner recess 124 of the outer plug body 16, locating another ring portion 112 over the inner plug 14 so that the two ring portions 112, 114 abut one another, and locating another pipe section 7 over the plug device 14. The method further includes installing the degradable plug device 110 into the pipe 10 as the pipe 10 is being inserted in a well.

Figure 9:
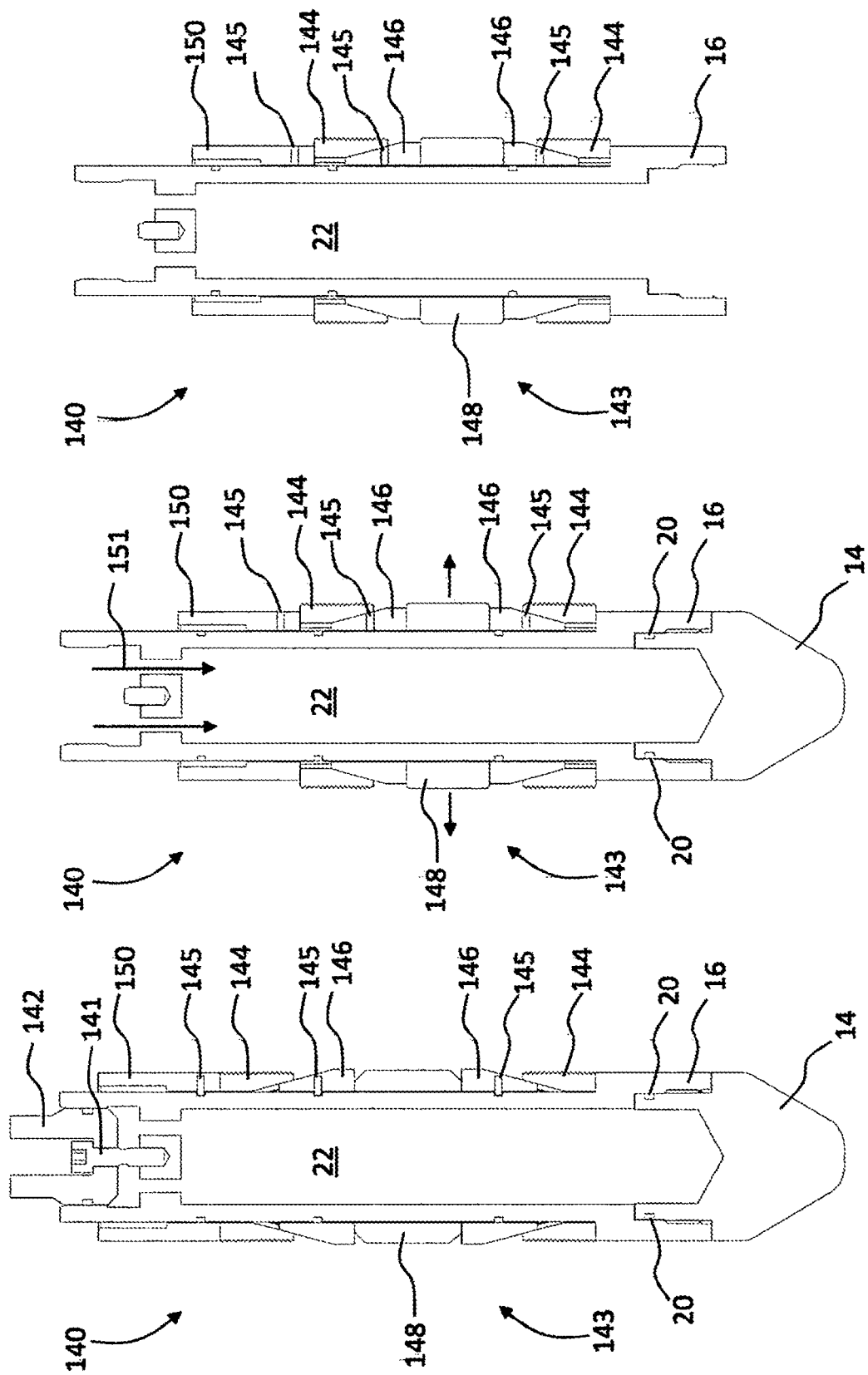
FIGS. 9(a), 9(b), and 9(c) show a plug device according to another embodiment of the invention.

FIGS. 9(*a*), 9(*b*); and 9(*c*) show a plug device according to another embodiment, generally designated 140. The embodiment of FIGS. 9(*a*), 9(*b*), and 9(*c*) is similar to the embodiment of FIGS. 5(*a*), 5(*b*) and 5(*c*) but with certain differing features as mentioned below. Like features to the arrangements of FIGS. 1, 2, 4, 5, 7 and 8 are shown with like reference numerals. In FIG. 9 the plug body 16 of the plug device 140 is shown to be tubular. In the embodiment shown the plug body 16 has an outside diameter of about 2.5 cm, but much larger outside diameters are envisaged to take account of a particular well. One end of the plug body 16 is closed by the inner plug 14. The other end of the plug body 16 is closed by another inner plug 142, which may be alternately termed an end cap. In one arrangement the plug body 16 and the end cap 142 are one piece, i.e. the plug body 16 and the end cap 142 are a single part. In another arrangement the plug body 16 and the end cap 142 are two pieces as shown in FIG. 9. In another arrangement the plug body 16 and the inner plug 14 are one piece, i.e. the plug body 16 and the inner plug 14 are a single part. In another arrangement the plug body 16 and the inner plug 14 are two pieces as shown in FIG. 9. In the embodiment of FIG. 9 the inner plug 14 may alternatively be termed an end cap. The chamber 22 comprises the internal space of the tubular plug body 16 which is closed by the inner plug 14 and the end cap 142 as shown in FIG. 9(*a*). An outer surface of the plug body 16 has a slip assembly 143, which comprises one or more jaws 144, one or more chamfered collars 146, a sealing ring 148, and a lock device 150. The sealing ring 148 may be of a rubberised material. The slip assembly 143 is activated by the lock device 150, which is a ring that is movable on an outer surface of the plug body 16. The slip assembly 143 is a known device and may alternatively be called an activation device or a grip device. When the lock device 150 is activated the slip assembly 143 is compressed and the chamfered collars 146 move on the outer surface of the plug body 16 and the jaws 144 move radially outwards as shown in FIG. 9(*b*). When the lock ring 150 is activated the sealing ring 148 is also compressed and expands radially outwards as shown in FIG. 9(*b*). Whereas only one slip assembly 143 is shown in another embodiment more than one slip assembly 143 may be provided. When there is more than one slip assembly 143, more than one sealing ring 148 and/or lock device 150 may be provided. The slip assembly 143 operates to secure and seal the plug device 140 within pipework, and may be alternatively termed a griping and sealing device. Also shown in FIG. 9 is a shear ring or pin 145 between the lock device 150 and the body 16. A shear ring or pin 145 is also shown between each chamfered collar 146 and the body 16. Upon movement of the lock ring 150 the three shear rings 145 break or rupture to permit the plug device 140 to move to the position shown in FIG. 9(*b*)0.

It will be appreciated that FIG. 9(*a*) shows the plug device 140 in a condition prior to activation, and FIGS. 9(*b*) and 9(*c*) show the plug device 140 with the slip assembly 143 in an activated condition. Furthermore, FIG. 9(*b*) shows the plug device 140 with the end cap 142 removed so that well fluid can enter as shown by arrows 151 to contact the internal surface of the chamber 22, and FIG. 9(*c*) shows the plug device 140 with the end cap 142 and the inner plug 14 removed so that well fluid can pass through the outer plug body 16.

In the embodiment of FIG. 9 the inner plug 14, the plug body 16, the end cap 142, the jaws 144, the chamfered collars 146 and the lock device 150 are of magnesium or similar disintegrable material, which may be coated on surfaces which do not form the chamber 22. In one embodiment the components of the slip assembly 143 may be of high carbon steel. The internal surfaces of the chamber 22 are uncoated. In FIGS. 9(*b*) and 9(*c*) it will be appreciated that well fluid is able to enter the chamber 22 to initiate corrosion or dissolution from inside the chamber 22 because the well fluid contacts the uncoated surfaces that comprise the chamber 22. The sealing ring 148 is typically not dissolvable. It will be understood that the chamber 22 can be flooded from below or above within the pipework to start the degradation depending on which way up the plug device 140 is located within the pipework. Also shown in FIG. 9 is a shear pin 141 connecting the end cap 142 with the body 16.

The plug device 140 can be deployed into a well from the surface, for example, running the plug device 140 in the completion/casing string or deployed into the well afterwards using known techniques such as on a wireline, slickline, jointed pipe or coil tubing, or deployed in a drill pipe, or dropped into the well from the surface. Accordingly, the plug device 140 does not need to be installed into the pipework beforehand. The plug device 140 is bi-directional in that it can be run into the well from above or below (i.e. top down or bottom up) depending on the setup of the well. FIG. 9(*a*) shows the plug device 140 before being deployed into the well and in a run position when being inserted into the well. As shown in FIG. 9(*a*) the chamber 22 is sealed before the plug device 140 is deployed into a well such that the chamber is dry. Once in the required position within the well (i.e. the required depth within the well) the slip device 143 of plug device 140 can be activated by operation of the lock device 150 as shown in FIG. 9(*b*) so that the jaws 144 bite into a wall of pipework within the well to inhibit the plug device 140 from moving up or down the pipework. In such a condition the sealing ring 148 is compressed so that it expands a diameter (i.e. circumference) thereof and makes a seal with the pipework so that pressure can be held above and/or below the plug device 140.

During the setting process of the plug device 140 a degradation initiation operation may be performed so that well fluid enters the chamber 22. Such an operation may include dropping a ball from the surface to move a sealed sleeve/piston, or dropping a rod or bar (or dissolvable material) into the well from the surface to break or remove the end cap 142 or the inner plug 14, or electronic activation, or applying pressure from the surface to move a sleeve/piston to burst the end cap 142 or rupture a part of the plug device 140 to allow fluid to enter the chamber 22. In another arrangement a setting device within the well is operated to grip the end cap 142 and break the shear pin 141 as shown in FIG. 9(*b*). In another arrangement, the protective coating of the end cap 142 or the plug body 16 may be scraped or punctured, so that the well fluid comes into contact with the magnesium and starts the corrosion process. In such a manner the plug device 140 can be activated from above or below within the well depending on how the plug device 140 is set up, i.e. depending on which way up the plug device 140 is located within the pipework. The pressure required to activate the plug device 140 (i.e. to remove one or both of the end cap 142 or the inner plug 14) can be adjusted according to the requirements from a very low pressure such as 1 PSI (6.9 kPa) and above to any well requirement to take account of the temperature and conditions within the well.

FIG. 9(b) shows the plug device 140 after the end cap 142 has been removed or ruptured as described above. Well fluid then contacts the uncoated surfaces of the chamber 22 to initiate the corrosion process as previously described. FIG. 9(c) shows the plug device 140 after the inner plug 14 has also been removed or ruptured as described above, for example by applying the predetermined pressure from above so that the inner plug 14 is pushed out of the plug body 16 so that it is free to fall into the well.

The arrangements of FIG. 9(b) allow a pressure seal to be maintained from below whilst the plug device 140 is dissolved over a period of typically two to three days, although a longer or a shorter period is also envisaged such as weeks or years depending the application. This allows pressure to be applied from above or from below the plug device 140 so that tasks within the well can be performed for a few days before over-pressuring in the region above the plug device 140 to push the inner plug 14 out of the pipe as shown in FIG. 9(c). In one arrangement the pressure required to push the inner plug 14 out of the plug body 16 might be 5000 PSI (approx. 34500 kPa). It will be understood that such a pressure is for a particular temperature rating, such as up to 250. degree. C. in these embodiments. The pressure required will typically depend on well conditions and the particular application required. The arrangements of FIG. 9 allow further options for operations and tasks within the well, for example, performing pressure testing of the pipework. It is envisaged that the plug device 140 of FIG. 9 would be useful plug and abandonment operations, but other uses for the plug device 140 are also envisaged.

It will be appreciated that in a similar manner to the previous embodiments, the plug device 140 is made of a degradable material and the surfaces of the plug device 140 that are in contact with well fluid (i.e. in the condition shown in FIG. 9(a)) are coated so that they are protected from the corrosive effect of the well fluid. The internal surfaces of the chamber 22 are uncoated such that when the plug device 140 has been activated (as shown in FIGS. 9(b) and 9(c)) the well fluid enters the chamber 22 to contact the exposed surfaces of the plug device 140 (i.e. the plug body 16, the inner plug 14) to initiate the corrosion process as previously described. Once pushed out of the plug body the inner plug 14 is then free to fall into the well under gravity, or reside near to the plug device 140 if the well is horizontal. If the plug device 110, 140 was entirely made of uncoated magnesium, it would start to corrode immediately on contact with well fluid, but through the use of the coatings on the various parts of the plug device 110, 140 it is possible to prevent or inhibit corrosion of the magnesium alloy, and to provide a more controlled corrosion and operation of the plug device 110, 140.

The method of operating the plug device 140 of FIG. 9 includes deploying the plug device 140 into a pre-installed pipe 10 within a well, and operating the slip assembly 143 to grip and seal the plug device 140 within the pipe 10. The method further includes removing the end cap 142 or the inner plug 14 from the outer plug body 16 so that well fluid is able to enter the chamber 22. The method includes removing the end cap 142 and the inner plug 14 so that fluid is able to pass through the outer plug body 16.

Figure 10:
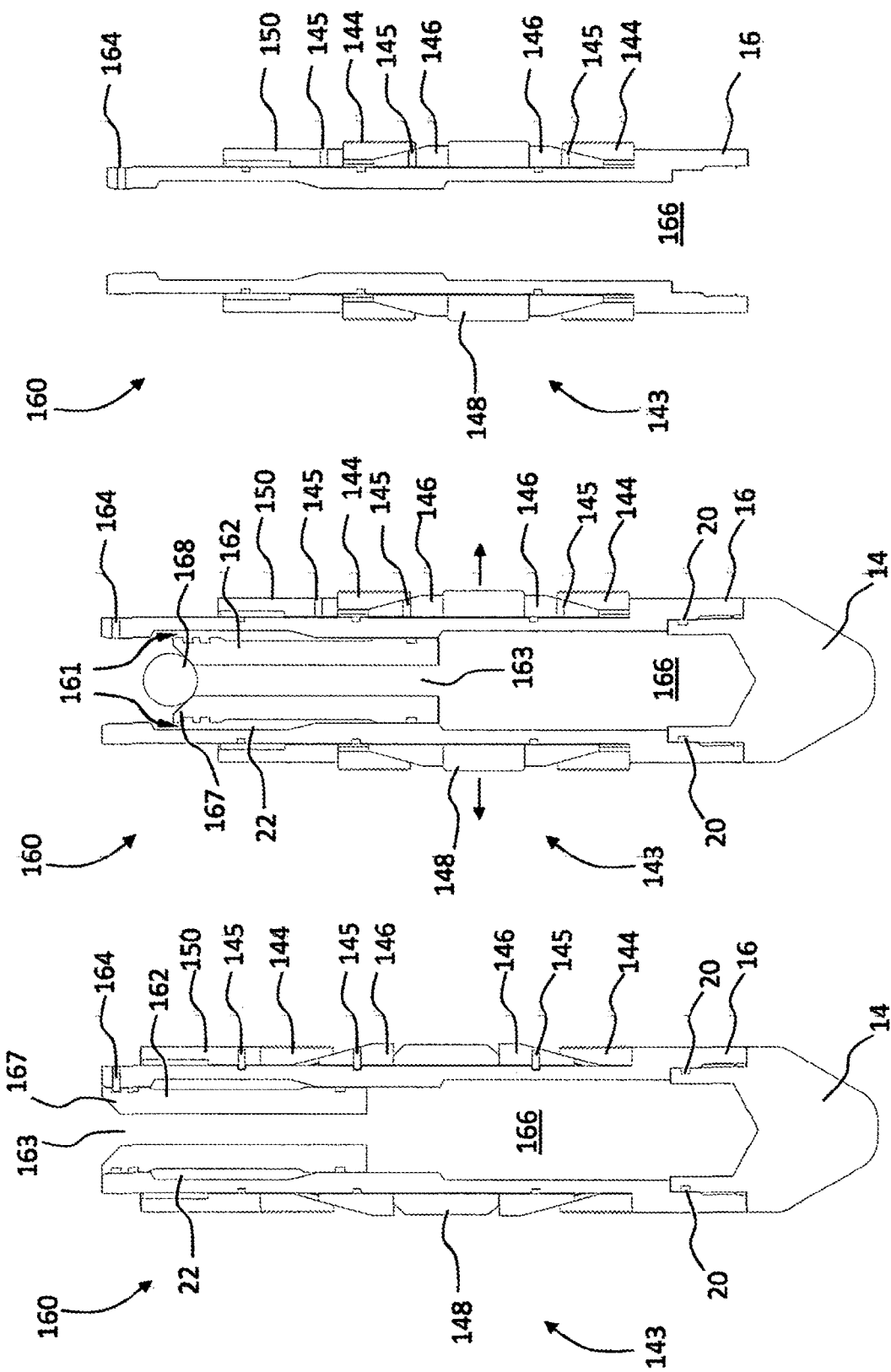
FIGS. 10(a), 10(b), and 10(c) show a plug device according to another embodiment of the invention.

FIGS. 10(a), 10(b), and 10(c) show a plug device according to another embodiment, generally designated 160. The embodiment of FIGS. 10(a), 10(b), and 10(c) is similar to the embodiment of FIGS. 5 and 9 but with certain differing features as mentioned below. Like features to the arrangements of FIGS. 1, 2, 4, 5, 7, 8 and 9 are shown with like reference numerals. In FIG. 10 the plug body 16 of the plug device 160 is shown to be tubular. In the embodiment shown the plug body 16 has an outside diameter of about 2.5 cm, but much larger outside diameters are envisaged to take account of a particular well. One end of the plug body 16 is closed by the inner plug 14. The other end of the plug body 16 has another inner plug 162, which may be alternately termed an end cap. In one arrangement the plug body 16 and the inner plug 162 are one piece, i.e. the plug body 16 and the inner plug 162 are a single part. In another arrangement the plug body 16 and the end cap 142 are two pieces as shown in FIG. 10. The inner plug 162 has a through-hole 163, which may be termed a channel or a port. In another arrangement the plug body 16 and the inner plug 14 are one piece, i.e. the plug body 16 and the inner plug 14 are a single part. In another arrangement the plug body 16 and the inner plug 14 are two pieces as shown in FIG. 10. The through-hole 163 is in communication with a central space 166 of the plug device 160. The central space 166 may be termed an inner space. The internal bore of the through-hole 163 has a coating to inhibit corrosion. The inner plug 162 is in sealing contact with the plug body 16 such that a ring-shaped chamber 22 is formed between the inner plug 162 and the plug body 16. An opening or mouth of the through-hole 163 has a ball seat 167 for location of a ball 168 thereon as shown in FIG. 10(b). In the embodiment of FIG. 10 the inner plug 14 may alternatively be termed an end cap. The chamber 22 comprises the internal space between the tubular plug body 16 and the inner plug 162 as shown in FIG. 10(a). An outer surface of the plug body 16 has a slip assembly 143 as previously described with reference to FIG. 9, which is activated by the lock device 150. In FIG. 10, whereas only one slip assembly 143 is shown in another embodiment more than one slip assembly 143 may be provided. When there is more than one slip assembly 143, more than one sealing ring 148 and/or lock device 150 may be provided. The slip assembly 143 operates to secure and seal the plug device 160 within pipework, and may be alternatively termed a griping and sealing device. Also shown in FIG. 10 is another shear ring or pin 164 between the inner plug 162 and the body 16. Upon movement of the inner plug 162 by the ball 168 the shear ring 164 breaks or ruptures to permit the inner plug 162 to move to the position shown in FIG. 10(b).

It will be appreciated that FIG. 10(a) shows the plug device 160 in a condition prior to activation, and FIGS. 10(b) and 10(c) show the plug device 160 with the slip assembly 143 in an activated condition. Furthermore, FIG. 10(b) shows the plug device 160 with the inner plug 162 in an activated condition after the ball 168 has moved it so that well fluid can contact the internal surface of the chamber 22 (as shown by arrows 161), and FIG. 10(c) shows the plug device 160 with the inner plug 162 and the inner plug 14 removed so that well fluid can pass through the outer plug body 16.

In the embodiment of FIG. 10 the inner plug 14, the plug body 16, the inner plug 162, the jaws 144, the chamfered collars 146 and the lock device 150 are of magnesium or similar disintegrable material, which may be coated on surfaces which do not form the chamber 22. In one embodiment the components of the slip assembly 143 may be of high carbon steel. The internal surfaces of the chamber 22 are uncoated. In FIGS. 10(b) and 10(c) it will be appreciated that well fluid is able to enter the chamber 22 to initiate corrosion or dissolution from inside the chamber 22 because the well fluid contacts the uncoated surfaces that comprise the chamber 22. It will be understood that the chamber 22 can be flooded from below or above within the pipework to start the degradation depending on which way up the plug device 160 is located within the pipework.

The plug device 160 can be deployed into a well from the surface, for example, running the plug device 160 in the completion/casing string or deployed into the well afterwards using known techniques such as on a wireline, slickline, jointed pipe or coil tubing, or deployed in a drill pipe, or dropped into the well from the surface. Accordingly, the plug device 160 does not need to be installed into the pipework beforehand. The plug device 160 is bi-directional in that it can be run into the well from above or below (i.e. top down or bottom up) depending on the setup of the well. FIG. 10(a) shows the plug device 140 before being deployed into the well and in a run position when being inserted into the well. As shown in FIG. 10(a) the chamber 22 is sealed before the plug device 140 is deployed into a well such that the chamber 22 is dry. However, the central space 166 is open to well fluid (via the through-hole 163) and is coated to inhibit corrosion as described herein. The central space 166 may be initially full of air or well fluid, and may assist with buoyancy or balance of the plug device 160. Once in the required position within the well (i.e. the required depth within the well) the slip device 143 of plug device 160 can be activated by operation of the lock device 150 as shown in FIG. 10(b) so that the jaws 144 bite into a wall of pipework within the well to inhibit the plug device 160 from moving up or down the pipework. In such a condition the sealing ring 148 is compressed so that it expands a diameter (i.e. circumference) thereof and makes a seal with the pipework so that pressure can be held above and/or below the plug device 160. The ball 168 is then dropped within the well to activate the inner plug 162 when required, which comprises a degradation initiation operation.

The degradation initiation operation of the plug device 160 may include dropping a rod or bar (or dissolvable material) into the well from the surface to move the inner plug 162, or electronic activation, or applying pressure from the surface rupture a part of the plug device 160 to allow fluid to enter the chamber 22. In another arrangement, the protective coating of the inner plug 14 or the plug body 16 may be scraped or punctured, so that the well fluid comes into contact with the magnesium and starts the corrosion process. In such a manner the plug device 160 can be activated from above or below within the well depending on how the plug device 160 is set up, and depending on which way up the plug device 160 is located within the pipework. The pressure required to activate the plug device 160 (i.e. to remove the inner plug 14) can be adjusted according to the requirements from a very low pressure such as 1 PSI (6.9 kPa) and above to any well requirement to take account of the temperature and conditions within the well.

FIG. 10(b) shows the plug device 160 after the inner plug 162 has been activated as described above. Well fluid then contacts the uncoated surfaces of the chamber 22 to initiate the corrosion process as previously described. FIG. 10(c) shows the plug device 160 after the inner plug 14 has also been removed or ruptured as described above, for example by applying the predetermined pressure from above so that the inner plug 162, the ball 168, and inner plug 14 is pushed out of the plug body 16 so that they are free to fall into the well.

The arrangements of FIG. 10(b) allow a pressure seal to be maintained from below whilst the plug device 160 is dissolved over a period of typically two to three days, although a longer or a shorter period is also envisaged such as weeks or years depending the application. This allows pressure to be applied from above or from below the plug device 160 so that tasks within the well can be performed for a few days before over-pressuring in the region above the plug device 160 to push the inner plug 162, the ball 168, and the inner plug 14 out of the pipe as shown in FIG. 10(c). In one arrangement the pressure required to push the inner plug 14 out of the plug body 16 might be 5000 PSI (approx. 34500 kPa). It will be understood that such a pressure is for a particular temperature rating, such as up to 250. degree. C. in these embodiments. The pressure required will typically depend on well conditions and the particular application required. The arrangements of FIG. 10 allow further options for operations and tasks within the well, for example, performing pressure testing of the pipework. It is envisaged that the plug device 160 of FIG. 10 would be useful plug and abandonment operations, but other uses for the plug device 160 are also envisaged.

It will be appreciated that in a similar manner to the previous embodiments, the plug device 160 is made of a degradable material and the surfaces of the plug device 160 that are in contact with well fluid (i.e. in the condition shown in FIG. 10(a)) are coated so that they are protected from the corrosive effect of the well fluid. The internal surfaces of the chamber 22 are uncoated such that when the plug device 160 has been activated (as shown in FIGS. 10(b) and 10(c)) the well fluid enters the chamber 22 to contact the exposed surfaces of the plug device 160 (i.e. the plug body 16, the inner plug 162) to initiate the corrosion process as previously described. Once pushed out of the plug body 16 the inner plug 14 and the inner plug 162 are then free to fall into the well under gravity, or reside near to the plug device 160 if the well is horizontal. If the plug device 160 was entirely made of uncoated magnesium, it would start to corrode immediately on contact with well fluid, but through the use of the coatings on the various parts of the plug device 160 it is possible to prevent or inhibit corrosion of the magnesium alloy, and to provide a more controlled corrosion and operation of the plug device 160.

The method of operating the plug device 160 of FIG. 10 includes deploying the plug device 160 into a pre-installed pipe 10 within a well, and operating the slip assembly 143 to grip and seal the plug device 160 within the pipe 10. The method further includes moving the inner plug 162 so that well fluid is able to enter the chamber 22. The method includes removing the inner plug 162 and the inner plug 14 so that fluid is able to pass through the outer plug body 16.

The above embodiments of the plug device 110, 140, 160 provide the advantage that the blocking and the unblocking of a well pipe can be more readily controlled. The plug device 110, 140, 160 provides a more positive way to control the unblocking of a pipe 10, and in effect operates as a valve device to open part of the well. The plug device 110, 140, 160 may alternatively be termed a valve device or a bather device. It is envisaged that with the embodiments of the invention the plug device 110, 140, 160 may be in situ in the well for a period of 2 to 3 years, and possibly up to 10 years, before being activated to release the inner plug 14 and/or the end cap 142 from the plug body 16 and/or operation of the inner plug 162. It will be appreciated that after activation the time taken to degrade the inner plug 162, inner plug 14 and plug body 16 may depend on the material thickness, fluid type and temperature etc.

Figure 11:
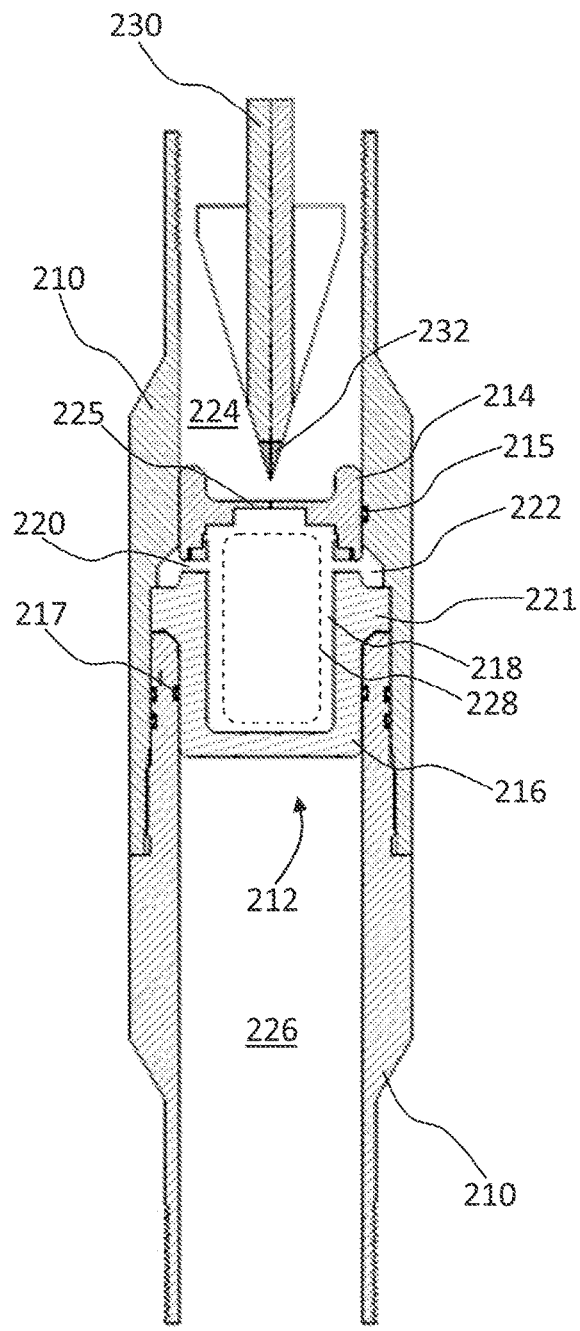
FIG. 11 shows a schematic cross section of a pipe with a plug device according to an embodiment.

FIG. 11 shows a schematic cross section of a pipe 210 with a plug device 212 according to an embodiment of the invention. The pipe 210 is comprised of two parts and the plug device 212 is located in a region between the two parts. A typical length of the plug device 212 might be 10 cm. The plug device 212 comprises a body having two parts 214, 216 which are sealed together (e.g. pressed together to provide an interference fit) so that they form a chamber 218 between the two parts 214, 216. As shown in FIG. 11 one of the parts 216 is cup-shaped and the other part 214 is a cap to close the open mouth of the cup shape. It will be appreciated that the parts 214, 216 may be of any suitable shape, e.g. flat or curved. One or more ports 220 are provided in the body so that the chamber 218 is in fluid communication with an exterior of the body. The one or more ports 220 may be termed body ports. In the embodiment shown the chamber 218 is in fluid communication with a circumferential recess 222 between the pipe 210 and the plug device 212. The circumferential recess 222 is on an exterior of the body. It will be understood that the circumferential recess 222 is an outer recess of the body (i.e. an external recess of the body). Whereas the ports 220 may be in either part 214, 216, in FIG. 11 the ports 220 are shown to be in the part 216. The ports 220 comprise radial bores of the part 216 to provide said fluid communication to the chamber 218. Each of the parts 214, 216 is sealed to the pipe with a respective "O" ring seal 215, 217. The part 216 also has a shoulder 221, which fits between the two parts of the pipe 210 so that the plug device 212 is secured within the pipe 210 by the shoulder 221.

The plug device 212 is primarily made of magnesium or similar disintegrable material. When the plug device 212 is in situ in the pipe 210, as shown in FIG. 11, the surfaces of the plug device 212 that can come into contact with well fluid, i.e. in the regions above 224 and below 226 the plug device 212, have a coating (i.e. a protective layer) that is resistant to corrosion. A spear or drop bar 230 is provided having a hardened tip 232 that is used to puncture a weakened portion 225 of the part 214 of the plug 212 so that the chamber 218 can be exposed to well fluid when required. The spear or drop bar 230 is dissolvable (e.g. of magnesium), and can be filled with acid or accelerant such as citric acid provided as a powder or in crystal form. It is envisaged that the acid or accelerant would be provided as a solid, and could be in the form of a tablet that is inserted into the chamber 218 upon assembly of the plug 212. The spear or drop bar 230 may be termed an actuation member.

The acid or accelerant is used to speed up the dissolution of the plug 212 from inside the chamber 218. Optionally a mass of citric acid 228 is provided in the chamber 218, which may be provided as a powder or in crystal form. When the part 214 of the plug 212 is punctured by the spear or drop bar 230 the citric acid 228 has the effect of improving the dissolving process by 1000% such that the dissolving process is significantly faster (e.g. 10 times faster). It will be appreciated that the internal surfaces of the chamber 218 are uncoated so that they can be exposed to well fluid.

"Degradable" is intended to mean that the two parts 214, 216 of the plug 212 is disintegrable, dissolvable, weakenable, corrodible, or consumable. It is to be understood that use herein of the term "degrade", or any of its forms, incorporates the stated meaning. For example, the two parts 214, 216 of the plug 212 could be made from magnesium, aluminium, controlled electrolytic metallic materials, described in more detail below, etc. and degradable upon exposure to one or more fluids available or deliverable downhole, such as water, brine, acid, oil, etc. By exposing the two parts 214, 216 of the plug 212 to an accelerant, the plug 212 can be removed without an intrusive, costly, or time-consuming operation such as milling.

Each of the two parts 214, 216 of the plug 212 effectively comprise an inner core coated in a protective layer. Materials appropriate for the purpose of degradable cores include magnesium, aluminium, controlled electrolytic metallic materials, etc. The controlled electrolytic materials as described herein are lightweight, high strength metallic materials. Examples of suitable materials and their methods of manufacture are given in US2011/0135953. These lightweight, high-strength and selectably and controllably degradable materials include fully-dense, sintered powder compacts formed from coated powder materials that include various lightweight particle cores and core materials having various single layer and multilayer nanoscale coatings. These powder compacts are made from coated metallic powders that include various electrochemically-active (for example having relatively higher standard oxidation potentials) lightweight, high-strength particle cores and core materials, such as electrochemically active metals, that are dispersed within a cellular nanomatrix formed from the various nanoscale metallic coating layers of metallic coating materials, and are particularly useful in borehole applications. Suitable core materials include electrochemically active metals having a standard oxidation potential greater than or equal to that of Zn, including as Mg, Al, Mn or Zn or alloys or combinations thereof. For example, tertiary Mg—Al—X alloys may include, by weight, up to about 85% Mg, up to about 15% Al and up to about 5% X, where X is another material. The core material may also include a rare earth element such as Sc. Y, La, Ce, Pr, Nd or Er, or a combination of rare earth elements. In other embodiments, the materials could include other metals having a standard oxidation potential less than that of Zn. Also, suitable non-metallic materials include ceramics, glasses (for example, hollow glass microspheres), carbon, or a combination thereof. In one embodiment, the material has a substantially uniform average thickness between dispersed particles of about 50 nm to about 5000 nm. In one embodiment, the coating (protective) layers are formed from Al, Ni, W or $Al_2O_3$, or combinations thereof. In one embodiment, the coating is a multi-layer coating, for example, comprising a first Al layer, an $Al_2O_3$ layer, and a second Al layer. In some embodiments, the coating may have a thickness of about 25 nm to about 2500 nm.

These powder compacts provide an advantageous combination of mechanical strength properties, such as compression and shear strength, low density, and selectable and controllable corrosion properties, particularly rapid and controlled dissolution when exposed to an accelerant such as citric acid. For example, the particle core and coating layers of these powders may be selected to provide sintered powder compacts suitable for use as high strength engineered materials having a compressive strength and shear strength comparable to various other engineered materials, including carbon, stainless and alloy steels, but which also have a low density comparable to various polymers, elastomers, low-density porous ceramics and composite materials.

During use of the plug device 212 as shown in FIG. 11, the 'O' rings 215, 217 prevent the well fluid from entering the uncoated chamber 218 of the plug 212. When the top part 214 is punctured the well fluid can then contact the uncoated surfaces of the plug device 212, i.e. the internal surfaces of the chamber 218, so that corrosion and rapid dissolving thereof can begin due to the presence of the accelerant 228 from either the spear or drop bar 230 or already present in the chamber 218. Well fluid and activated accelerant 228 also pass out of the chamber 218 through the ports 220 and into the circumferential recess 222 where it contacts the uncoated surface of the plug (i.e. the external circumference thereof). When the plug 212 is unseated from the position shown in FIG. 11 the uncoated surfaces of the two parts 214, 216 are full exposed to the well fluid and they dissolve. It will be understood that the plug device 212 can be "activated" (i.e. dissolved/opened) when required and that after removal/dissolving of the plug 212 the two parts 214, 216 are removed from the pipe 210 so that it has a fully open bore. In other words the pipe 210 is fully open so that well fluid can pass through it.

Figure 12:
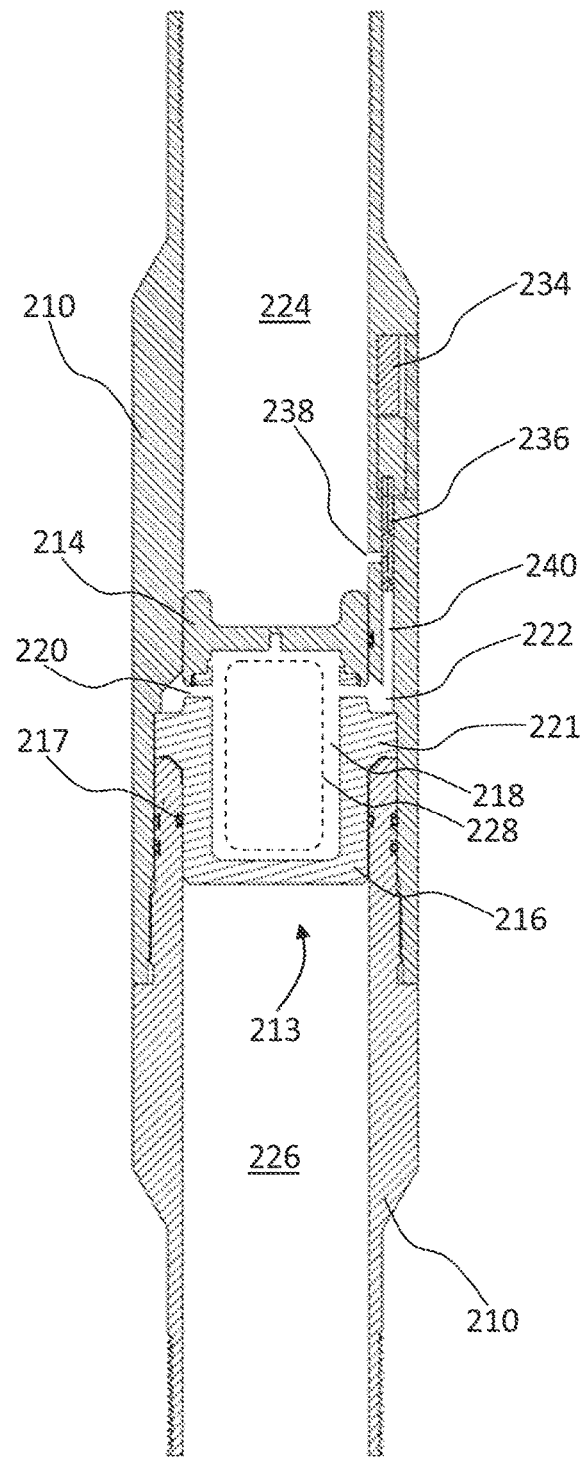
FIG. 12 shows a schematic cross section of a pipe with a plug device according to another embodiment.

FIG. 12 shows a schematic cross section of a pipe 210 with a plug device 213 according to another embodiment of the invention. In FIG. 12 like features to the arrangements of FIG. 11 are shown with like reference numerals. In FIG. 12 the plug 213 is substantially the same as FIG. 11 apart from the manner in which it is activated. The plug 213 of FIG. 12 has a battery pack and controller 234 that is used to operate an electromechanical valve 236 in a sidewall of the pipe 210. A port 238 is provided in a side wall of the pipe 210 in the upper region 224 of the pipe. The port 238 may be termed a pipe port. A side wall of the pipe 210 also has a flow channel 240 between the port 238 and the circumferential recess 222. The electromechanical valve 236 controls fluid communication between the port 238 and the circumferential recess 222. In FIG. 12 the electromechanical valve 236 is shown to be closed so that the fluid path between the port 238 and the circumferential recess 222 is closed. The operation of the electromechanical valve 236 may be controlled remotely from the surface by communication with the controller 234, or the controller 234 may operate the electromechanical valve 236 automatically at a set time. When communicating with the controller 224 from the surface this may be by via a wire or wirelessly for example by a Radio Frequency Identification (RFID) and actuation device, or via acoustical or pressure actuation. For example, the controller 234 may have a pressure operated device (e.g. acoustic operated or fluid pulse operated), which has a receiver unit (not shown) and repeater units (not shown) are clamped along the exterior of the pipework string from the surface to the controller 234. The repeater units are spaced out along the pipework, e.g. every 200 m, and a pressure/acoustic signal is sent from the surface via the repeater units to the receiver unit coupled to the controller 234 so that the opening or closing of the electromechanical valve 236 can be controlled from the surface. In effect the repeater units operate to receive and transmit the pressure/acoustic signal along the pipe string from the surface to the controller 234.

Alternatively, a wireless signal (e.g. a radio signal) may be sent from the surface to wireless repeater units (not shown) that are clamped along the exterior of the pipework string from the surface to the controller 234. The wireless repeater units are spaced out along the pipework, e.g. every 200 m, and a wireless signal (e.g. a radio signal) is sent from the surface via the wireless repeater units to the receiver unit coupled to the controller 234 so that the opening or closing of the electromechanical valve 236 can be controlled from the surface.

In the embodiment where the controller 234 is a pressure operated device which is fluid pulse operated, a pressure transducer and electronics (not shown) are built in to the controller 234. Pressure is then applied from the surface for set periods of time by holding the pressure followed by a period of controlled pressure reduction. For example, a series of pressure pulses/signals are sent down to the pressure operated device and once the pressure pulse are received in the correct order and correct time frame the electromechanical valve 236 will operate. The cycle of applying pressure followed by a controlled reduced pressure provides a way of communicating with the pressure transducer and electronics, which in turn opens or closes the electromechanical valve 236 so that the fluid communication between the port 238 and the circumferential recess 222 can be controlled from the surface to permit well fluid to enter the body port 220. It will be understood that the plug device 213 can be "activated" (i.e. dissolved/opened) when required and that after removal/dissolving of the plug 213 the two parts 214, 216 are removed from the pipe 210 so that it has a fully open bore. In other words the pipe 210 is fully open so that well fluid can pass through it. The mass of citric acid 228 is also an optional feature within the chamber 218, which may be provided as a powder or in crystal form. Whereas one port 238 is shown it will be understood that more than one port 238 may be provided.

FIG. 13 shows a schematic cross section of a pipe 210 with a plug device 215 according to another embodiment of the invention. In FIG. 13 like features to the arrangements of FIGS. 11 and 12 are shown with like reference numerals. In FIG. 13 the plug 215 comprises a tubular body 244, which is closed at either end by a respective dissolvable cap 246. The tubular body 244 is not dissolvable and has the shoulder 221 which fits between (i.e. is integral with) adjacent pipes 210. Together the tubular body 244 and caps 246 define the chamber 218 which has the accelerant 228 in it. The accelerant 228 in the chamber 218 is an optional feature comprising the mass of citric acid 228 as described above. If the plug 215 is required to corrode/dissolve more quickly than the accelerant 228 would be present in the chamber 218. The port 238 (shown most clearly in FIG. 15) in the side wall of the pipe 210 is provided in a surface of the pipe perpendicular to the drawing. The port 238 allows fluid communication between the upper region 224 of the pipe and the chamber 218 via a rupture device 248 (see FIGS. 14 and 15). In a similar manner to the previous embodiment the external regions of the plug 215 that are in contact with the well fluid are coated to inhibit corrosion.

FIG. 14 shows a cross section of the embodiment shown in FIG. 13 along line B-B. In FIG. 14 like features to the arrangements of FIG. 14 are shown with like reference numerals. In FIG. 14 three rupture devices 248 are shown within the sidewall of the pipe 210 around a circumference thereof. It will be understood that more of less than three rupture devices 248 may be used. Each rupture device 248 is inserted in a respective hole 250 in the sidewall of the pipe 210. Each hole 250 is then closed with a respective blanking plug 249 which is sealed to its respective hole 250 with an 'O' ring seal 251. A channel 252 is provided at the end of each hole 250 to the rupture device 248.

FIG. 15 shows a cross section of the embodiment shown in FIG. 14 along line C-C. In FIG. 15 like features to the arrangements of FIGS. 13 and 14 are shown with like reference numerals. In FIG. 15 the flow channel 240 in the sidewall of the pipe 240 is shown, which is between the rupture device 248 and the chamber 218. A flow channel 254 is also shown between the port 238 (shown in FIG. 13) and the rupture device 248. In operation the plug 215 is activated by applying a high pressure of e.g. 5000 PSI (approx. 34500 kPa) to the region 224 above the plug 215. The high pressure is a pressure threshold and breaks each rupture device 248 and well fluid is then able to pass into the three ports 238, through the three flow channel 254, through the three rupture devices 248, through the three flow channels 240 and into the chamber 218 so that the corrosion from the inside thereof begins.

The flow channels 240, 252, 254 fluidly connect the upper region 224 and the chamber 218 so that the well fluid contacts the citric acid 228 (it will be appreciated that there is another flow channel between the flow channel 240 and the chamber 218, but this is not shown due to the particular cross section of FIG. 15). When the well fluid contacts the acid powder 228 an accelerated degrading of the two caps 246 of the plug 215 is provided. It will be understood that the plug device 215 can be "activated" (i.e. dissolved/opened) when required and that after activation of the plug 215 the mass of citric acid 228 is removed and the two caps 246 are also removed from the pipe 210 so that it has a fully open bore. In other words the pipe 210 is fully open so that well fluid can pass through it. With the arrangement of FIGS. 13, 14 and 15, the tubular body 244 stays in place (i.e. between the two sections of the pipe 210) after the plug 215 has been activated and the end caps 246 have been removed because it is not dissolvable.

FIG. 16 shows a schematic cross section of a plug device 217 according to another embodiment of the invention. In FIG. 16 like features to the arrangements of FIGS. 11 to 13 are shown with like reference numerals. In FIG. 16 the plug 217 has an outer sleeve or piston 256 to activate it. The outer sleeve 256 is sealed to and slidable on an outside of the parts 214, 216 to open/close the ports 220. The outer sleeve 256 is sealed to the parts 214, 216 with two "O" ring seal 260. The outer sleeve 256 is also sealed to the pipe (not shown) with an "O" ring seal 258. In FIG. 16 the plug device 217 is shown in the closed position whereby the outer sleeve 256 covers the ports 220. The plug 217 is activated, for example by applying an increased hydraulic pressure, to slide the outer sleeve 256 relative to the part 214, 216 in the direction 257 so that the port 220 is uncovered. It will be appreciated that applying an increased hydraulic pressure comprises applying hydraulic pressure to the well fluid above a pressure threshold. When the ports 220 are uncovered well fluid is able to enter the chamber 218 via the ports 220 so that the mass of citric acid 228 is activated. Once activated the parts 214, 216 and the outer sleeve 256 then dissolve so that the pipework in which the plug 217 is located is fully open bore so that well fluid can pass through it. In one arrangement the outer sleeve 256 is made of a non-degradable material so that it does not dissolve. It will be appreciated that the shoulder 221 is also present on the plug 217, which fits between the two parts of the pipe 210 so that the plug device 217 is secured within the pipe 210 by the shoulder 221.

FIG. 17 shows a schematic cross section of a pipe 210 with a plug device 219 according to another embodiment of the invention. FIG. 17a shows a detail of the embodiment shown in FIG. 17. In FIGS. 17 and 17a like features to the arrangements of FIGS. 11 to 16 are shown with like reference numerals. The embodiment of FIGS. 17 and 17a is similar to the embodiment of FIG. 16 but with certain differing features as mentioned below. In FIG. 17 the outer sleeve 256 has an extended portion 262, which is a continuation of the outer sleeve 256 past the end of the body 216. The extended portion 262 has channels 264 (see FIG. 17a) machined on the outer circumference thereof. A pin 266 is provided in a wall of the pipe 210 for locating in the channels 264. The pin 266 may be termed a guide part or an indexing pin. The port 238 is provided in a side wall of the pipe 210 in the upper region 224 of the pipe. The channels 264 provide fluid communication between the port 238 in the extended portion 262 and the ports 220 of the chamber 218. The outer sleeve 256 is a rotatable sleeve (e.g. an indexing sleeve) and the ports 220 can be opened or closed by rotation of the outer sleeve 256 so that it moves in the direction of arrow 270, which is controlled by the application of hydraulic pressure. Applying an increased hydraulic pressure comprises applying hydraulic pressure to the well fluid above a pressure threshold. In the position shown in FIG. 17a the pin 266 is in a position such that there is full fluid communication between the port 238 and the ports 220. An indexing spring 268 is provided around the circumference of the part 226 and acts between the shoulder 221 of the part 216 and the outer sleeve 256. Also shown are a plurality of pin positions 265, 267 such that movement of the extended portion 262 locates the pin 266 on one of the pin positions 265, 267 causing the outer sleeve 256 to rotate on the body 216. In the pin position 265 the ports 220 are closed, and in the pin position 267 the ports 220 are open. The closed pin position 265 provides a start position for the outer sleeve 256 before movement to the open pin position 267. The multiple pin positions 265, 267 allow the outer sleeve 256 to be rotated around the part 214 until it moves back to the fully open position 266. When in increased pressure is applied the outer sleeve 256 moves down, and when pressure is reduced (i.e. bled off) the outer sleeve 256 moves up and rotates by following the machined channels 264 due to the pin 266. The indexing spring 268 may be a mechanical spring, or a compressed gas, or liquid (e.g. oil), and may be termed a resilient member. The spring 268 biased the outer sleeve in a predetermined position. Optionally the mass of citric acid 228 may be provided in the chamber 218 to provide a reduced time for degradation of the parts 214, 216.

In the embodiment of FIGS. 17 and 17a, when well fluid enters the ports 220 of the chamber 218 the parts 214, 216 begin to degrade. If the mass of citric acid 228 is present in the chamber 218 this is also activated by the well fluid. Once activated the parts 214, 216 and the outer sleeve 256 then dissolve so that the pipe 210 is a fully open bore so that well fluid can pass through it. The plug 219 may be a single use item or a multiple use item. In the case of the plug 219 being a multiple use item the outer sleeve 256 is not dissolvable and only the parts 214, 216 are dissolvable. With such an arrangement the outer sleeve 256 can be reused or discarded if it is inoperable.

Figure 18:
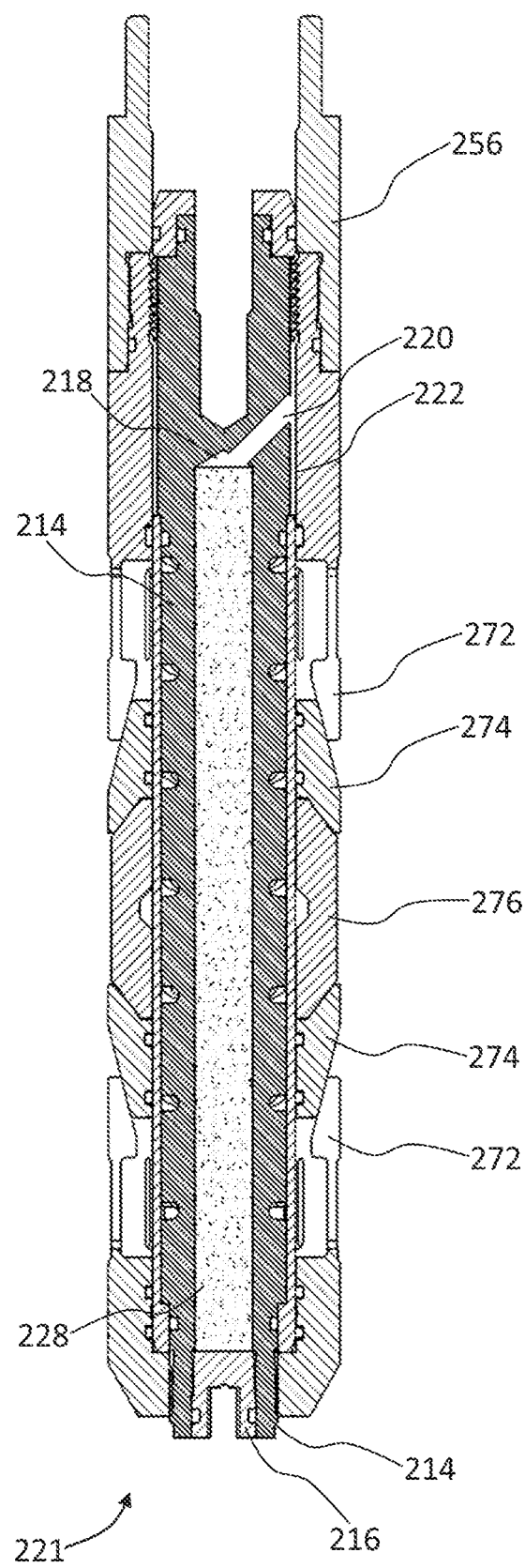
FIG. 18 shows a schematic cross section of a plug device according to another embodiment.
Figure 19:
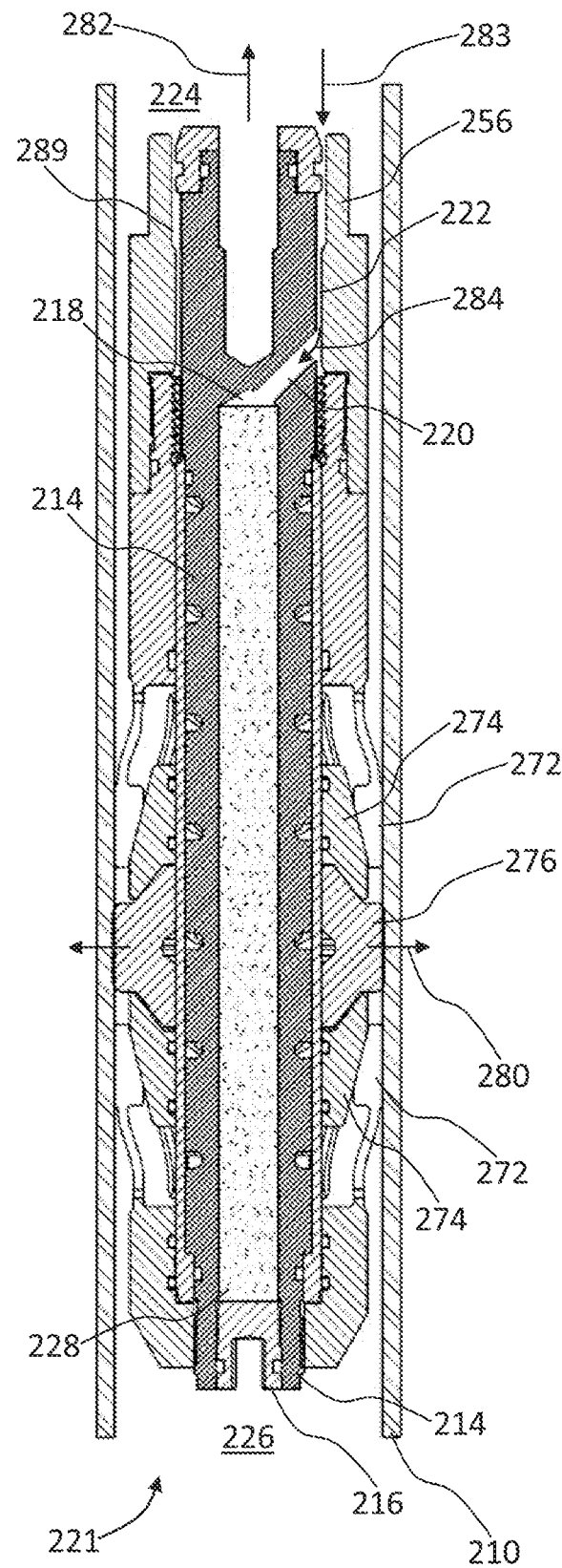
FIG. 19 shows a schematic cross section of the plug device of FIG. 18 in a pipe according to an embodiment.

FIG. 18 shows a schematic cross section of a plug device 221 according to another embodiment of the invention, and in an un-activated condition. FIG. 19 shows a schematic cross section of the plug device 221 of FIG. 18 in a pipe 210, and in an activated condition. The embodiment of FIGS. 18 and 19 is similar to the above embodiment but with certain differing features as mentioned below. Like features to the arrangements of previous Figures are shown with like reference numerals. In FIGS. 18 and 19 the part 214 is shown to be cup-shaped. In the embodiment shown the part 214 has an outside diameter of about 2.5 cm, but much larger outside diameters are envisaged to take account of a particular well. The part 214 is closed by the part 216 to form the chamber 218 with the mass of citric acid 228 therein. An outer surface of the part 214 has a slip assembly, which comprises one or more jaws 272, one or more chamfered collars 274, a sealing ring 276, and the outer sleeve 256. The sealing ring 276 may be of a rubberized material. The slip assembly is activated by movement of the outer sleeve 256 on an outer surface of the part 214 that is axially movable relative thereto to the position shown in FIG. 19. The slip assembly is a known device and may alternatively be called an activation device or a grip device. When the outer sleeve 256 is moved the slip assembly is compressed and the chamfered collars 274 move on the outer surface of the part 214 and the jaws 272 move radially outwards as shown in FIG. 19. The sealing ring 276 is also compressed and expands radially outwards as shown in FIG. 19 by arrows 280. Whereas only one slip assembly is shown in another embodiment more than one slip assembly may be provided. When more than one slip assembly is used, more than one sealing ring 276 and/or set of jaws 272 may also be provided. The slip assembly operates to secure and seal the plug device 221 within pipework 210, and may be alternatively termed a griping and sealing device.

It will be appreciated that FIG. 18 shows the plug device 221 in a condition prior to activation, and FIG. 19 show the plug device 221 with the slip assembly in an activated condition after moving of the part 214 in the direction of arrow 282. Furthermore, FIG. 19 shows the plug device 221 such that well fluid can enter the port 220 and the chamber 218 as shown by arrows 283 and 284 to contact the internal surface of the chamber 218. It will be understood that the plug device 221 can be "activated" (i.e. dissolved/opened) when required and that after removal/dissolving of the two parts 214, 216 are removed so that well fluid can pass through the parts 256, 272, 274, 276.

In the embodiment of FIGS. 18 and 19 the parts 214, 216, the jaws 272, the chamfered collars 274 and the outer sleeve 256 are of magnesium or similar disintegrable material, which may be coated on surfaces which do not form the chamber 218. In one embodiment the components of the slip assembly may be of high carbon steel. The internal surfaces of the chamber 218 are uncoated. In FIGS. 18 and 19 it will be appreciated that well fluid is able to enter the chamber 218 to initiate corrosion or dissolution from inside the chamber 218 because the well fluid contacts the uncoated surfaces that comprise the chamber 218, and the corrosion may be accelerated by the mass of citric acid 228. The sealing ring 276 is typically not dissolvable. In an alternative arrangement the sealing ring 276 is dissolvable. It will be understood that the chamber 218 can be flooded from below or above within the pipework 210 to start the degradation depending on which way up the plug device 221 is located within the pipework 210.

The plug device 221 can be deployed into a well from the surface, for example, running the plug device 221 in the completion/casing string or deployed into the well afterwards using known techniques such as on a wireline, slickline, jointed pipe or coil tubing, or deployed in a drill pipe, or dropped into the well from the surface. Accordingly, the plug device 221 does not need to be installed into the pipework beforehand. The plug device 221 is bi-directional in that it can be run into the well from above or below (i.e. top down or bottom up) depending on the setup of the well. FIG. 18 shows the plug device 221 before being deployed into the well and in a run position when being inserted into the well. As shown in FIG. 18 the chamber 218 is sealed before the plug device 221 is deployed into a well such that the chamber is dry. Once in the required position within the well (i.e. the required depth within the well) the slip device of plug device 221 can be activated by operation of the outer sleeve 256 as shown in FIG. 19 so that the jaws 272 bite into a wall of pipework 210 within the well to inhibit the plug device 221 from moving up or down the pipework 210. In such a condition the sealing ring 276 is compressed so that it expands a diameter (i.e. circumference) thereof and makes a seal with the pipework 210 so that pressure can be held above and/or below the plug device 221.

Figure 20:
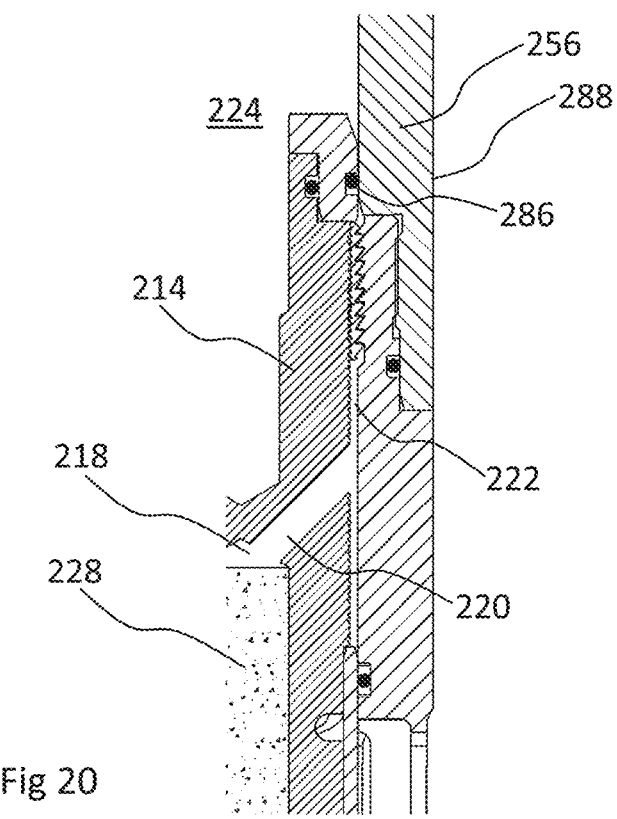
FIG. 20 shows a detail of the embodiment of FIGS. 18 and 19 according to one embodiment.

FIG. 20 shows a detail of the embodiment of FIGS. 18 and 19 according to one embodiment. FIG. 20 shows that an "O" ring seal 286 is provided between the part 214 and the outer sleeve 256 so that well fluid cannot enter the circumferential recess 222 until the outer sleeve 256 is moved relative to the part 214. It will be understood that the internal surfaces of the circumferential recess 222 are uncoated. In other words the surface of the part 214 and the outer sleeve 256 that form the circumferential recess 222 are uncoated. It will also be understood that the external surfaces of the outer sleeve 256 are coated. In other words the outer surface 288 of the outer sleeve 256 is coated. In the embodiment of FIG. 20, the internal bore of the outer sleeve 256 is relieved as shown at 289 in FIG. 19 to allow flooding of the uncoated surface of the circumferential recess 222 and the chamber 218 via the ports 220.

Figure 21:
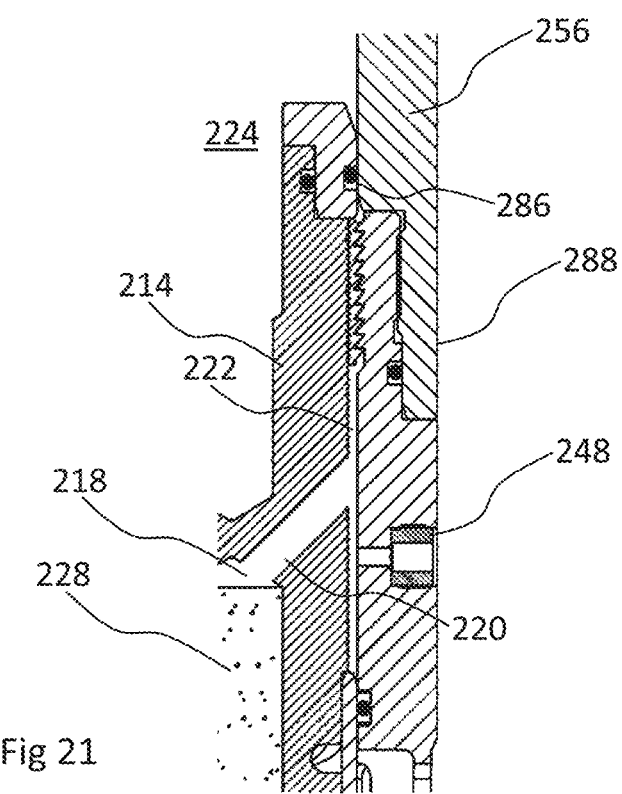
FIG. 21 shows a detail of the embodiment of FIGS. 18 and 19 according to another embodiment.

FIG. 21 shows a detail of the embodiment of FIGS. 18 and 19 according to another embodiment. In FIG. 21 like features to the arrangements of FIG. 20 are shown with like reference numerals. FIG. 21 shows that the plug has a rupture device 248 as per the arrangements of FIGS. 14 and 15, which is inserted in the sidewall of the outer sleeve 256.

In operation a high pressure of e.g. 5000 PSI (approx. 34500 kPa) to the region 224 above the plug breaks the rupture device 248. Well fluid is then able to pass into the circumferential recess 222 and into the chamber 218. With the arrangement of FIG. 21 the outer sleeve 256 is not required to slide on the part 214 and the internal bore of the outer sleeve 256 is not required to be relieved as shown at 289 in FIG. 19. In a similar manner to the previous embodiment the external regions of the plug shown in FIG. 21 that are in contact with the well fluid are coated to inhibit corrosion.

The rupture device 248 may alternatively be a shear device (i.e. a shear pin, shear ring, shear sleeve) that breaks upon applying a high pressure to the region 224 and thereby allowing well fluid to enter the region 222 via the shear device or via the relieved part 289 of the internal bore of the outer sleeve 256 in a similar manner to the arrangement of FIG. 19. With such an arrangement the outer sleeve 256 of FIG. 21 is slidable on the part 214 in the case of the shear device being a shear pin/ring/sleeve. The shear device may be made of the same or similar degradable material, which ensures that the shear device can be dissolved when required. Upon breaking of the shear device the fluid is able to enter the chamber 218 to start the corrosion process.

During the setting process of the plug device 221 shown in FIGS. 18 to 21 a degradation initiation operation may be performed so that well fluid enters the chamber 218. Such an operation may include applying pressure from the surface to move the outer sleeve 256 relative to the parts 214, 216, or to break the rupture device 248 to allow fluid to enter the chamber 218. In another arrangement a setting device within the well is operated to grip the top of the part 214 and move the outer sleeve 256 relative to the part 214. In such a manner the plug device 221 can be activated from above or below within the well depending on how the plug device 221 is set up, i.e. depending on which way up the plug device 221 is located within the pipework. The pressure required to activate the plug device 221 can be adjusted according to the requirements from a very low pressure such as 1 PSI (6.9 kPa) and above to any well requirement to take account of the temperature and conditions within the well.

The arrangements of FIG. 19 allow a pressure seal to be maintained whilst the plug device 221 is dissolved over a period of typically two to three days, although a longer or a shorter period is also envisaged such as weeks, months or years depending on the application. This allows pressure to be applied from above or from below the plug device 221 so that tasks within the well can be performed for a few days. The arrangements of FIG. 19 allow further options for operations and tasks within the well, for example, performing pressure testing of the pipework 210. The arrangements of FIG. 19 also allow temporary plugging and abandonment operations to be performed whereby after activation of the plug 221 from above or below the chamber 218 floods before placing cement on top of the plug 221. The plug then continues to degrade and subsequently drops into the well, which permits the cement to be milled out at a future date if required without requiring milling of the plug to remove it. Such an arrangement means that only the cement is required to be milled, which is less complex. It is envisaged that the plug device 221 of FIGS. 18 and 19 would also be useful for more permanent abandonment operations, but other uses for the plug device 221 are also envisaged.

The method of operating the plug device 221 of FIGS. 18 and 19 includes deploying the plug device 221 into a pre-installed pipe 210 within a well, and operating the slip assembly to grip and seal the plug device 221 within the pipe 210. The method further includes moving the outer sleeve 256 or operating the rupture device 248 so that well fluid is able to enter the chamber 218. However, the plug devices 212, 213, 215, 217, 219 are required to be fitted between two adjacent sections of pipe 210 as it is inserted into the well or deployed afterwards using wireline/slickline/coiled tubing/jointed pipe etc.

It will be understood from the foregoing description that the part 214, 216, the caps 246, and optionally the sleeve 256 are solid and of magnesium or similar disintegrable material. The arrangements of the above embodiments allow a pressure seal to be maintained from below in the region 226 or from above in the region 224 whilst the plug device is dissolved over a period of typically two to three days, although a longer or a shorter period is also envisaged. This allows pressure to be applied from above in the region 224, or from below in the region 226, to perform tasks within the well for a few days.

Figure 22:
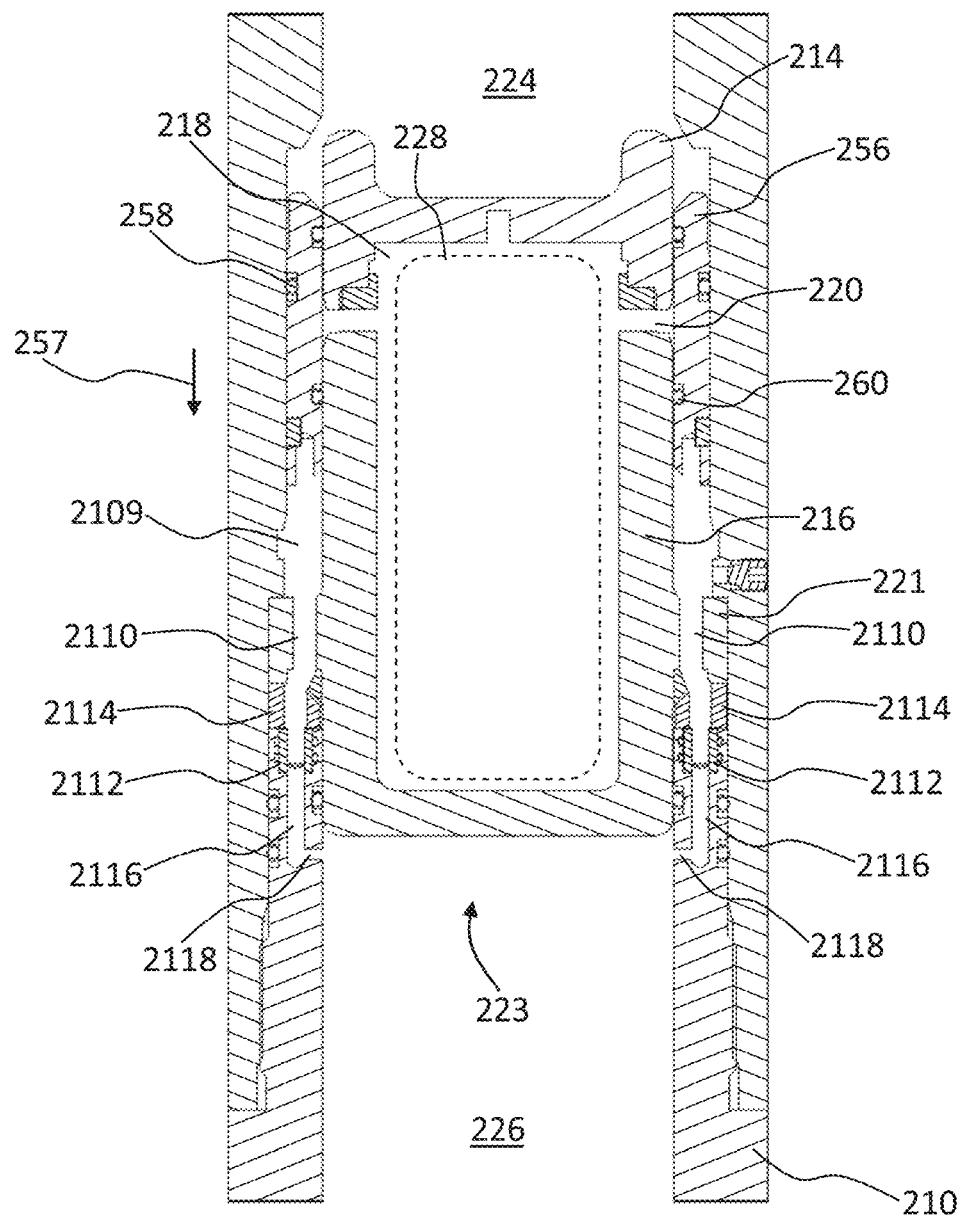
FIG. 22 shows a schematic cross section of a plug device according to another embodiment.

FIG. 22 shows a schematic cross section of a plug device 223 according to another embodiment of the invention. In FIG. 22 like features to the arrangements of FIGS. 11 to 13 and 16 are shown with like reference numerals. The arrangements of FIG. 22 are similar to the arrangements of FIG. 16 but with certain differing features as mentioned below. In FIG. 22 the plug device 223 is provided with a fluid 2109 in a region between the shoulder 221 of the part 216, the pipe 210, and the outer sleeve 256. The fluid 2109 operates as a transfer medium and may be a compressed gas or a liquid (e.g. oil), and may be termed an operating fluid or a pressure transfer fluid. The fluid 2109 is inert so that it does not corrode the plug 223. A channel 2110 is provided in the shoulder 221 to allow fluid communication with a rupture device 2112. A spacer ring 2114 may be provided if required between the shoulder 221 and the rupture device 2112. The spacer ring 2114 also has a channel in it, and is an optional feature that may not be required. Another fluid channel 2116 is provided in a sidewall of the lower pipe section 210, which is between the rupture device 2112 and a bleed port 2118 below the plug 223. The fluid channel 2116 may be termed a lower fluid channel or lower flow channel. The bleed port 2118 provides fluid communication between the lower region 226 and the rupture device 2112. Whereas two of each of the channel 2110, the rupture device 2112, the spacer ring 2114, the channels 2116, and the bleed port 2118 are shown it will be appreciated that only of each of these items is required for operation of the plug device 223. In a similar manner to the previous embodiment the external regions of the plug 223 that are in contact with the well fluid are coated to inhibit corrosion.

In FIG. 22 the plug device 223 is shown in the closed position whereby the outer sleeve 256 covers the ports 220. The plug 223 is activated, for example by applying an increased hydraulic pressure in the region above the plug device 223 shown at 224. The hydraulic pressure is transferred by the fluid 2109 to the rupture device 2112 which breaks to allow the outer sleeve 256 to slide relative to the part 214, 216 in the direction 257 so that the ports 220 are uncovered. The compressed fluid 2109 then passes into the lower region 226 of the pipe 210 via the channels 2110, the rupture device 2112, the spacer ring 2114, the channels 2116, and the bleed port 2118. The bleed port 2118 also allows any slurry from the dissolving plug to be vented below the plug device 223. In an alternative arrangement there are no bleed ports 2118 and the channels 2116 are longer to provide a greater volume so that they can fully contain the volume of the fluid 2109. With such an arrangement the fluid 2109 does not enter the lower region 226 of the pipe, and the longer channels 2116 may be termed a pipe chamber.

It will be appreciated that applying an increased hydraulic pressure in the region 224 comprises applying hydraulic pressure to the well fluid above a pressure threshold. When the ports 220 are uncovered well fluid is able to enter the chamber 218 via the ports 220 so that the mass of citric acid 228 is activated. Once activated the parts 214, 216 and the outer sleeve 256 then dissolve so that the pipework in which the plug 223 is located is fully open bore so that well fluid can pass through it. In one arrangement the outer sleeve 256 is made of a non-degradable material so that it does not dissolve. It will be appreciated that the shoulder 221 fits between the two parts of the pipe 210 so that the plug device 223 is secured within the pipe 210 by the shoulder 221.

The rupture devices 248 and 2112 of FIGS. 14, 15, 17, 21 and 22 may be any device that breaks upon application of hydraulic pressure above a threshold. It is envisaged that the rupture devices 248, 2112 may be a disc or a cylinder of any suitable material. The rupture devices 248, 2112 allow the plug devices 215, 219, 221, 223 to be operated with a much greater actuation pressures which may be required in a particular well application.

Figure 23:
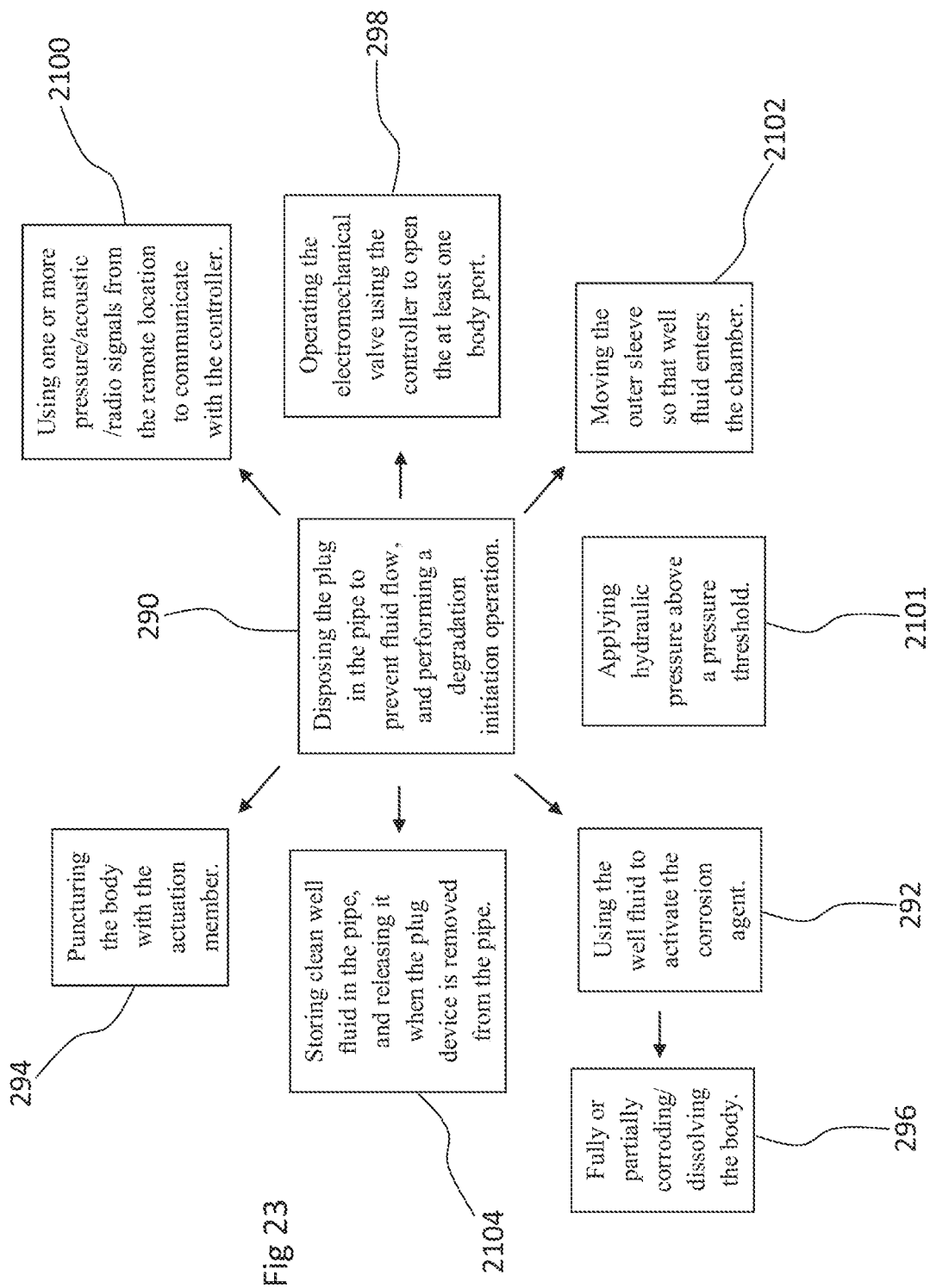
FIG. 23 shows steps of a method according to an embodiment.

FIG. 23 shows steps of a method according to an embodiment of the invention. It will be appreciated that the steps may be performed in a different order, and may not necessarily be performed in the order shown in FIG. 23. FIG. 23 shows a method of operating a degradable plug device for a pipe, the method including disposing the plug in the pipe so that fluid flow through the pipe is prevented and performing a degradation initiation operation such that fluid is able to enter the chamber to initiate corrosion or dissolution of the body from inside the chamber, as shown at 290.

The method includes using the well fluid to activate the corrosion agent to increase the rate of corrosion or dissolution of the body from inside the chamber, as shown at 292. The method includes puncturing of the body with the actuation member so that the well fluid enters the chamber, as shown at 294. The method includes puncturing of the body at the weakened portion, as shown at 294. The method includes delivering the corrosion agent to the chamber using the actuation member when the body is punctured by the actuation member, as shown at 294. The method includes fully corroding or dissolving the body, as shown at 296. The method includes fully corroding or dissolving the two caps, as shown at 296.

The method includes said degradation initiation operation comprising operating the electromechanical valve using the controller to open the at least one body port so that well fluid enters the chamber to initiate corrosion or dissolution of the body from inside the chamber, as shown at 298. The method includes operating the electromechanical valve automatically at a predetermined time, as shown at 298.

The method includes operating the electromechanical valve from a remote location using remote communication with the controller, as shown at 298. The method includes using one or more pressure signals or acoustic signals from the remote location to communicate with the controller, as shown at 2100. The method includes using one or more radio signals from the remote location to communicate with the controller, as shown at 2100.

The method includes said degradation initiation operation comprising applying hydraulic pressure to the well fluid above a pressure threshold to break the at least one rupture device so that well fluid enters the chamber to initiate corrosion or dissolution of the body from inside the chamber, as shown at 2101.

The method includes said degradation initiation operation comprising moving the outer sleeve so that well fluid enters the chamber to initiate corrosion or dissolution of the body from inside the chamber, as shown at 2102. The method includes axially sliding or rotating the outer sleeve relative to the body to uncover the at least one body port, as shown at 2102. The method includes moving the outer sleeve by applying a hydraulic pressure to the well fluid above a pressure threshold, as shown at 2102.

The method includes seating the body between two portions of the pipe, as shown at 290.

The method includes deploying the degradable plug device into a pre-installed pipe within a well, and operating the slip assembly to grip and seal the degradable plug device within the pipe, as shown at 290. The method includes operating the slip assembly by said movement of the outer sleeve. The method includes moving the outer sleeve relative to the body using the setting device, as shown at 2102. The method includes using a corrosion-inhibiting coating as the protective layer. The method includes assembling the degradable plug within the pipe, and locating another pipe section over the plug device. The method includes installing the degradable plug device into the pipe as the pipe is being inserted in a well, as shown at 290. The method includes locating one or more degradable plugs into the pipe, and locating the pipe into a well, as shown at 290.

The method further including venting said operating fluid 2109 into the interior of the pipe 210 upon breaking of the at least one rupture device 248, 2112. Alternatively, the method further includes venting said operating fluid 2109 into the pipe chamber upon breaking of the at least one rupture device 248, 2112.

The method includes storing clean well fluid in the pipe 210 in a region 224 above the degradable plug device, and releasing the clean well fluid into the pipe 210 in a region below 226 the degradable plug device when the plug device is removed from the pipe 210 or when the plug device is at least partially corroded or dissolved, as shown at 2104.

It will be appreciated that if the plug device 212, 213, 215, 217, 219, 221 was entirely made of uncoated magnesium, it would start to corrode immediately on contact with well fluid.

Through the use of the coatings on the various parts of the plug device 212, 213, 215, 217, 219, 221 and the use of a mass of citric acid 228 it is possible to prevent corrosion of the magnesium alloy, and to provide a more controlled corrosion and operation of the plug device 212, 213, 215, 217, 219, 221.

The above embodiments of the plug device 212, 213, 215, 217, 219, 221 provide the advantage that the unblocking of the pipe 10 can be more readily controlled. The plug device 212, 213, 215, 217, 219, 221 provides a more positive way to control the unblocking of a pipe 210, and in effect operates as a valve device to open part of the well. The plug device 212, 213, 215, 217, 219, 221 may alternatively be termed a valve device or a barrier device. It is envisaged that with the embodiments of the invention the plug device 212, 213, 215, 217, 219, 221 may be in situ in the well for a period of 2 to 3 years, and possibly up to 10 years, before being activated to start the dissolving process. It will be appreciated that after activation the time taken to degrade the parts 214, 216 may depend on the material thickness, fluid type and temperature etc.

All of the embodiments described herein can be deployed into the well using wireline/slickline/coil tubing or jointed pipe or set traditionally in a similar manner to a bridge plug, and then used as a barrier within the well. It will be understood that rather than using milling tools or wire to recover or remove the plug devices described herein, they are subsequently activated so that fluid enters the chamber 18 to degrade or dissolve the plug devices from within. In effect the chamber 18 is a closed chamber (i.e. hermetically sealed) until the degradation initiation operation has happened.

In the embodiments herein the use of citric acid 228 is described for use in the chamber 218. It will be appreciated that the citric acid 228 is an acid or accelerant that may be termed a corrosion agent. The citric acid 228 (i.e. corrosion agent) is provided in an un-activated form in the chamber 218 and the plug undergoes an activation event when the plug device 212, 213, 215, 217, 219, 221 undergoes a degradation initiation operation.

In the foregoing description the degradable plug device may be activated by the application of hydraulic pressure above a pressure threshold, which may be between 1300 to 206800 kPa, or approximately 31000 kPa.

It will be understood from the foregoing that the plug device 212, 213, 215, 217, 219, 221 may be used for many different well applications, and is not limited to the uses described above. For example, in one arrangement the plug device 212, 213, 215, 217, 219, 221 can be used to store clean well fluid in the pipe 210 above the plug device in the region 224 shown in the Figures. The clean well fluid is released when the plug device 212, 213, 215, 217, 219, 221 undergoes a degradation initiation operation. Such an arrangement permits flushing operations to be performed in the well. It will be understood that the clean well fluid is relatively free of debris, and may be fresh sea water, or may be defined as clean within the commonly used definition in the industry.

All of the embodiments described herein can be deployed into the well using wireline or set traditionally in a similar manner to a bridge plug, and then used as a bather within the well. It will be understood that rather than using milling tools or wire to recover or remove the plug devices described herein, they are subsequently activated so that fluid enters the chamber 22 to degrade or dissolve the plug devices from within. In effect the chamber 22 is a closed chamber until the degradation initiation operation has happened.

What is claimed is:

1. A degradable plug device configured to be disposed within a pipe for preventing flow of a well fluid through the pipe, the degradable plug device comprising:
    a body which is at least partially comprised of a degradable material, wherein the body comprises a chamber therein, and wherein the body comprises at least one body port extending therethrough;
    a sleeve slidably disposed along an outside surface of the body, wherein the sleeve comprises at least one sleeve port extending therethrough, wherein the body and the sleeve define a circumferential space therebetween, wherein the at least one body port extends between the chamber and the circumferential space, and wherein the at least one sleeve port extends between the circumferential space and an exterior of the sleeve;
    a slip assembly disposed around the body, wherein the slip assembly is configured to grip and seal the degradable plug device against the pipe upon relative movement of the body and the sleeve;
    fluid seals disposed between the body and the sleeve on opposing sides of the at least one body port and the at least one sleeve port, wherein the fluid seals fluidly isolate a portion of the circumferential space from the well fluid within the pipe; and
    at least one breakable device disposed within the at least one sleeve port to block flow of the well fluid therethrough, wherein the at least one breakable device fluidly isolates a portion of the sleeve port from the well fluid within the pipe, and wherein the at least one breakable device is configured to break via an increasing pressure of the well fluid within the pipe above a pressure threshold such that the well fluid is able to enter the chamber through the at least one sleeve port, the circumferential space, and the at least one body port to initiate corrosion or dissolution of the body from inside the chamber such that the flow of the well fluid through the pipe is permitted.

2. The degradable plug device according to claim 1, wherein the chamber comprises a corrosion agent therein which is provided in an un-activated form, said well fluid providing an activation of the corrosion agent to increase a rate of corrosion or dissolution of the body from inside the chamber.

3. The degradable plug device according to claim 1, wherein the body comprises two parts that cooperate to define the chamber therebetween, wherein one of the two parts is cup-shaped and the other of the two parts is a cap to close an open mouth of the cup-shaped part.

4. The degradable plug device according to claim 1, wherein the breakable device comprises a rupture device configured to break via the increasing pressure of the well fluid within the pipe above the pressure threshold.

5. The degradable plug device according to claim 1, wherein the breakable device comprises a shear device configured to break via the increasing pressure of the well fluid within the pipe above the pressure threshold.

6. The degradable plug device according to claim 1, wherein the slip assembly comprises one or more jaws and one or more sealing elements.

7. A method of operating a degradable plug device for controlling flow of a well fluid through a pipe, wherein the degradable plug device comprises a body which is at least partially made of a degradable material, a sleeve slidably disposed along an outside surface of the body, fluid seals disposed between the body and the sleeve, and a slip assembly disposed around the body, wherein the body comprises a chamber therein and at least one body port, wherein the sleeve comprises at least one sleeve port having at least one breakable device disposed therein, wherein the body and the sleeve define a circumferential space therebetween, wherein the fluid seals are located on opposing sides of the at least one body port and the at least one sleeve port to fluidly isolate a portion of the circumferential space from the well fluid within the pipe, the method including:
    disposing the degradable plug device in the pipe;
    causing relative movement of the body and the sleeve to cause the slip assembly to grip and seal the degradable plug device against the pipe so that the flow of the well fluid through the pipe is prevented; and
    increasing pressure of the well fluid located within the pipe to cause the at least one breakable device to break such that the well fluid located within the pipe is able to enter the chamber through the at least one sleeve port, the circumferential space, and the at least one body port to initiate corrosion or dissolution of the body from inside the chamber such that the flow of the well fluid through the pipe is permitted.

8. The method according to claim 7, wherein the chamber of the degradable plug device comprises a corrosion agent therein which is provided in an un-activated form, and the method further comprises:
    using the well fluid to activate the corrosion agent to increase the rate of corrosion or dissolution of the body from inside the chamber.

9. The method according to claim 7, wherein the at least one body port extends between the chamber and the circumferential space, and wherein the at least one sleeve port extends between the circumferential space and an exterior of the sleeve.

10. The method according to claim 7, wherein the breakable device comprises a rupture device configured to break via the increasing pressure of the well fluid within the pipe.

11. The method according to claim 7, wherein the breakable device comprises a shear device configured to break via the increasing pressure of the well fluid within the pipe.

12. The method according to claim 7, wherein the slip assembly comprises one or more jaws and one or more sealing elements.

* * * * *